US009494675B2

(12) United States Patent
McCorkle

(10) Patent No.: US 9,494,675 B2
(45) Date of Patent: Nov. 15, 2016

(54) SYSTEM AND METHOD FOR NONLINEAR RADAR

(71) Applicant: John W. McCorkle, Vienna, VA (US)

(72) Inventor: John W. McCorkle, Vienna, VA (US)

(73) Assignee: APPLIED SIGNALS INTELLIGENCE, INC., Reston, VA (US)

( * ) Notice: Subject to any disclaimer, the term of this patent is extended or adjusted under 35 U.S.C. 154(b) by 383 days.

(21) Appl. No.: 14/255,146

(22) Filed: Apr. 17, 2014

(65) Prior Publication Data

US 2014/0313071 A1    Oct. 23, 2014

Related U.S. Application Data

(60) Provisional application No. 61/812,995, filed on Apr. 17, 2013.

(51) Int. Cl.
| | |
|---|---|
| *G01S 13/02* | (2006.01) |
| *G01S 7/28* | (2006.01) |
| *G01S 7/41* | (2006.01) |
| *G01S 13/10* | (2006.01) |
| *G01S 13/28* | (2006.01) |
| *G01S 13/88* | (2006.01) |

(52) U.S. Cl.
CPC .. *G01S 7/28* (2013.01); *G01S 7/41* (2013.01); *G01S 13/106* (2013.01); *G01S 13/28* (2013.01); *G01S 13/887* (2013.01)

(58) Field of Classification Search
CPC ................... G01S 13/106; G01S 13/28; G01S 13/887; G01S 7/28; G01S 7/41
USPC ............................................. 342/202, 385
See application file for complete search history.

(56) References Cited

U.S. PATENT DOCUMENTS

2011/0076939 A1\* 3/2011 Sato ................... H01Q 21/0025
455/39

OTHER PUBLICATIONS

Kosinski, John A., W. Devereux Palmer and Michael B. Steer. "Unified Understanding of RF Remote Probing." IEEE Sensors Journal, vol. 11, No. 12, Dec. 2011, pp. 3055-3063.
Cripps, Steve C. "Advanced Techniques in RF Power Amplifier Design." 2002. Artech House, Norwood, MA.
Wetherington, Joshua M. and Michael B. Steer. "Robust Analog Canceller for High-Dynamic-Range Radio Frequency Measurement." IEEE Transactions on Microwave Theory and Techniques, vol. 60, No. 6, Jun. 2012, pp. 1709-1719.

(Continued)

*Primary Examiner* — Timothy A Brainard
(74) *Attorney, Agent, or Firm* — Posz Law Group, PLC

(57) ABSTRACT

A non-linear radar is disclosed that is able to detect non-linear target responses that are below the harmonic-noise floor of the radar. To accomplish this below-the-noise-floor sensitivity feature the proposal specifically addresses all of the problems commonly faced by non-linear radar such as linearity of the transmitter path, receiver path, and size, weight, and power, and cost (SWaP-C). The radar operates in both standard and nonlinear modes with signal processing that allows display of nonlinear alone, linear alone, or both types of backscatter. Different combinations of six methodologies allow customization to fit different application needs, from low-cost modest performance, to higher cost and extremely high performance.

13 Claims, 9 Drawing Sheets

(56) References Cited

OTHER PUBLICATIONS

Walker, Aaron, Michael Steer and Kevin G. Gard. "A Vector Intermodulation Analyzer Applied to Behavioral Modeling of Nonlinear Amplifiers with Memory." IEEE Transactions on Microwave Theory and Techniques, vol. 54, No. 5, May 2006, pp. 1991-1999.
Fazi, Christian., Frank Crowne and Marc Ressler. "Link Budget Calculations for Nonlinear Scattering." 6th European Conference on Antennas and Propagation (EUCAP), Mar. 2012, pp. 1146-1150.

* cited by examiner

SYSTEM AND METHOD FOR NONLINEAR RADAR

CROSS-REFERENCE TO RELATED APPLICATIONS

This application claims priority from provisional application 61/812,995, filed on 17 Apr. 2013, titled "SYSTEM AND METHOD FOR NONLINEAR RADAR," the contents of which are incorporated by reference in their entirety.

FIELD OF THE INVENTION

This application relates to a system and method for generating and sending signals and receiving linear and nonlinear reflections of those signals. Furthermore, objects reflecting those signals can reflect not only the sent signals and harmonics of the sent signals, but also add their own modulation to those reflected signals. More particularly it relates to a system and method for realizing a nonlinear radar (NLR) that not only detects the presence of linear and nonlinear terms, but also detects modulation on those terms. More particularly it relates to a system and method for generating, sending and receiving signals for the purpose of detecting, ranging, and discriminating between different objects illuminated by the sent signals as well as receiving the modulation on those signals so as to aid discrimination between objects and to receive information carried by the modulation.

BACKGROUND OF THE INVENTION

Beyond the classic role of radar to detect and measure the range to an object, and discriminate between objects, disclosed is a system and method to detect and use the different facts about the backscatter. These facts include: (1) whether or not nonlinear backscattered signals exist; (2) what the characteristics of the nonlinearity are, such as the shape of the nonlinear curvature and relative magnitudes and phases of $2^{nd}$, $3^{rd}$, $4^{th}$, $5^{th}$ order terms etc.; (3) whether or not these nonlinear backscattered signals are modulated; and (4) characteristics of this modulation, such as characteristic features obtained using a joint-time-frequency analysis or wavelet analysis. The use of these facts allows the system and method to perform new functions. For example, the fact that the nonlinear backscatter is, or is not, modulated can be used to infer that the object causing the nonlinear backscatter is a piece of electrical equipment that is either operating (powered-on) or not. For another example, the modulation characteristics can be used to infer circuit state changes that allow classification of the type of target, such as a type of cell-phone or WiFi access point, or reading data that is driving those circuit states.

Nonlinear backscatter from an electronics device changes with any current or voltage that is applied to it by the circuit surrounding the device. Example devices include a diode, vacuum tube, bipolar junction transistor (BJT), junction field effects transistor (JFET), a metal-oxide-metal junction as occurs where rusted metal pieces or dissimilar metals contact each other, a metal-oxide-semiconductor (MOS) junction such as found in a MOSFET, and essentially all semiconductor devices used in electronic circuits. Therefore, a NLR can be used to measure or relate circuit conditions or states to modulation carried on the backscatter signal. The range at which a NLR can perform these detection, discrimination, and classification functions depend on its sensitivity and the nonlinear RCS and bandwidth of the target of interest.

Radar is the preeminent long-range day/night all weather (rain, dust, snow) "eyes and ears" of the human race. Modern radar systems must not only detect objects that reflect radio waves and measure their range, they must discriminate between different types of targets. In order to do this discrimination, modern radars have used six domains:

(1) radar cross section (RCS)—both the absolute and relative magnitudes of reflected energy are used to detect and discriminate between targets;
(2) multi-frequency backscatter metrics—the relative phase and magnitude of a target's backscatter at multiple frequencies is used to discriminate between different types of targets;
(3) polarimetry—which is used to infer orientation & shape metrics;
(4) high range resolution—which is used to get down-range profiles able to identify, for example, different trucks or aircraft by their range profile;
(5) high angular or cross-range resolution—which is obtained using both real or synthetic aperture beam-forming to allow imaging and isolation of one target from another and identify targets by their image shape when combined with high range resolution;
(6) doppler measurement and analysis, both macro and micro—which is used to
  (a) discriminate between reflecting objects based on their speed, such as discerning extremely small targets that are moving within large stationary clutter (like a person walking in a forest),
  (b) discern between and classify objects, or infer what mode they are operating in based on their vibrations, such as those linked with the spin-rate and number of blades used on a turbine or propeller, and
  (c) discriminate between different objects by analyzing local motion, where examples include (i) inverse SAR (ISAR) such as where the motion of a ship superstructure swaying back and forth with the ocean waves, effectively rotating about the main hull, provides Doppler velocity that is proportional to height above the rotation center, and (ii) the limbs of a person swaying relative to the torso; and
(7) nonlinear responses from targets containing junctions, like rusty chains with metal-oxide-metal junctions, or active electronics devices that have various kinds of semiconductor junctions, in order to discriminate between passive and active targets.

"Unified Understanding of RF Remote Probing," by John A. Kosinski, W. Devereux Palmer, Michael B. Steer, IEEE SENSORS JOURNAL, VOL. 11, NO. 12, December 2011 pp. 3055-3063 Steve C. Cripps, Advanced Techniques in RF Power Amplifier Design, 2002 Artech House, Norwood, Mass., 2002016427, ISBN 1-58053-282-9 is a recent overview of remote sensing technology that covers both linear and NLR. "Robust Analog Canceller for High-Dynamic-Range Radio Frequency Measurement," by Wetherington, Joshua M.; Steer, Michael B., Microwave Theory and Techniques, IEEE Transactions on, vol. 60, no. 6, pp. 1709-1719, June 2012 is a recent book describing advanced power amplifier design techniques that address nonlinear behavior in power amplifiers. The author states on page 79 that "more focused effort should be directed at using two-carrier tests to derive polynomial models rather than single-carrier gain and phase sweeps." The disclosed method does exactly that, it allows high resolution measurements of the parameters for a polynomial model. "A Vector Intermodulation Analyzer Applied to Behavioral Modeling of Nonlinear Amplifiers With Memory," by Aaron Walker, Michael Steer, and Kevin G. Gard, IEEE TRANSACTIONS ON MICROWAVE THEORY AND TECHNIQUES, VOL. 54, NO. 5, May 2006, pp 1991-1999 is a recent article showing the extreme lengths that are taken to mitigate nonlinear behavior in a spectrum analyzer or receiver. The problem with the approach shown is that while it works for a highly control test apparatus, it does not work for a general radar problem where the backscatter signal picked up by the receiver is a high dynamic range random process due to the transmit signals interaction with random targets and clutter. The problem is that even as highly developed as radar has become in the domains of (1) to (6) listed in the previous paragraph, its ability to discriminate between active and passive targets (domain (7)) is not highly developed. Furthermore, the use of NLR to remotely collect information-bearing modulation on the nonlinear backscatter signal and use it to aid discrimination, classification, determination of circuit conditions, and to remotely receive data when the circuit conditions are modulated by data has not been done heretofore. While NLR has been used in specialty applications like tracking insects tagged with a tiny diode and wideband antenna, it has not been broadly applied to problems that have uncontrolled targets-of-opportunity. Adding better nonlinear capability promises to address a major shortfall with current radar systems—a high false alarm rate caused by an inability to discriminate between the particular objects of interest and the huge volume of undesired "clutter" objects using only the first five domains listed above.

The disclosed NLR addresses this shortfall and provides a huge reduction in fall alarms for a myriad of applications or uses. One of these uses is to quickly and reliably find improvised explosive devices (IEDs). IEDs are difficult to detect simply because they are surrounded by so much clutter. They are currently causing significant damage to US and allied forces. Disclosed is a system and method to bring nonlinear target behavior into radar's tool-kit of discriminators to quickly identify high priority man-made objects—objects that are hidden by a plethora of detects from both man-made and naturally occurring objects like rocks, trees, bumps in the terrain, buildings, rubble, etc.

A small but hard set of problems has caused previous NLR systems to fail to obtain the wide use that linear radar has enjoyed. The set of problems is summarized as problems (a)-(f) in the list below. From a phenomenology perspective, the key problems with even an ideal NLR are (1) that the received signal, in free space, power falls off in range (R) as a function of $R^8$ (for the $3^{rd}$ order term) as opposed to normal radar that falls off with $R^4$, and (2) that the nonlinear radar cross section (NL-RCS) is much smaller than the normal body-size driven RCS. Together, these two factors drastically reduce the operational range of even an ideal, perfectly linear, radar.

These fundamental-physics drive realizations to high power levels, high receiver sensitivity, wide bandwidth, ultra high linearity and to be operationally feasible, a low size weight and power and cost (SWaP-C). To be more specific, a system must simultaneously addresses problems (a)-(f) listed below.

(a) On the receive side, the nonlinear (or harmonic) backscatter term is extremely small yet must be received in the presence of the large fundamental returns—a situation that requires extremely low noise and internally generated harmonics, or in other words, extremely high dynamic range from the receiver.

(b) On the transmit side, high transmit power is needed to illicit a large enough nonlinear backscatter to be measurable at an operationally useful range but at the same time, the transmitter's own spurious/harmonic emissions must be low enough that they don't cover-up the tiny nonlinear backscatter energy—a situation requiring extremely high linearity in the transmitter.

(c) In order to resolve targets at different ranges and not have nonlinear responses generated by targets a different ranges all pile on top of one another, wide bandwidths are needed—a situation that requires (a) and (b) to be done across wide bandwidths, making narrowband designs using deep stop-band narrowband filters unfeasible.

(d) Operational needs place strict limits on size weight and power and cost (SWaP-C), so regardless of how difficult it is to find a low SWaP-C solution for (a), (b), and (c), the solution must be low SWaP-C.

(e) The ultimate range resolution and operating range depends on target's nonlinear RCS and its bandwidth—a situation that requires (a), (b), (c), and (d) to be met in a system that must have modes constrained enough to work within the frequency ranges of the in-going and out-coming coupling coefficients of the target (i.e. getting power into a target at the fundamental frequencies, and the harmonic terms out at a different frequencies), and at the same time be flexible enough to work with a wide variety of targets with a wide variety of frequency ranges and bandwidths.

(f) Operational scenarios must permit shorter ranges and have reasonable target sets that recognize that even if we had an ideal radar, the $R^8$ drop in power for an NLR versus $R^4$ drop for a linear radar means that the NLR will never operate as far as normal radar.

To illustrate problem (f), "Link budget calculations for nonlinear scattering," by Fazi, C.; Crowne, F.; Ressler, M., Antennas and Propagation (EUCAP), 2012 6th European Conference on, vol., no., pp. 1146-1150, 26-30 Mar. 2012 gives an example case of a 1000 watt radar, where $R_0$, the range where the received signal-to-noise-ratio (SNR) is 1, or 0 dB (i.e. the signal and noise powers match) was 320 km for the normal (linear) backscatter but only 2.7 km for the NLR using 3rd order backscatter.

Assuming the received power of the nonlinear response varies as $R^8$ a receiver integration gain of 256 (24 dB) is required to double $R_0$ to 5.4 km. At this range, the received signal is typically below the harmonic-noise-floor of the transmitter and receiver. As such, this 24 dB of integration would not work and would only reveal the radar's own nonlinearities. This integration cannot be done without a system and method that is either inherently more linearly than currently available, or that cancels nonlinear terms generated in the radar itself. Disclosed is an NLR that which can do either or both.

The difficulty of reducing nonlinear terms is particularly difficult for the receiver. The transmitter only needs to manage a few (one or two) signals—signals that are well known, repeatable, and under the designers control. The fact that there are few signals means that there are few and well-known nonlinear terms. The fact that so much is known, repeatable, and under the designer's control allows multiple techniques, circuit topologies, pre-distortion, and feedback loops to help linearize the transmitter. The receiver, on the other hand, is exposed to backscatter from a multitude of random targets of different sizes and at different angles and ranges. This backscatter sums to a diverse waveform with a high peak-to-average ratio. The time varying and high peak-to-average signal causes time varying nonlinear terms to be generated in the sensitive and wideband receiver circuits—e.g. low-noise-amplifier (LNA), mixers, gain control circuits, and analog-to-digital converters (ADC). These time varying nonlinear terms must be reduced or eliminated in order to allow integration of the desired nonlinear response of the target to achieve extended ranges.

Even if we assume an ideal wideband linear radar, (e) and (f) from above must address the fundamental-physics limitations. The solution to (e) and (f) is to choose a suitable target at a suitable range. For example, the IED detection application is ideal for NLR. An IED is only hard to detect because it is surrounded by so much similar looking clutter. An IED's nonlinear response may be instrumental in making it stand out from all the clutter surrounding it. Furthermore, the search area is relatively small since IEDs are placed close to known roadways or paths where vehicles that make attractive targets for IEDs travel. That being the case, the NLR can be positioned at a relatively short range. For example, trucks targeted by the IEDs could carry a modest size (~100 watts, ~1 m² antenna) NLR. A low flying helicopter or airship could also carry the radar. If successful, such a radar would dramatically affect operations where IEDs are a threat. So part of the problem space is solved just by changing the scenario (range and target type). Clearly if the NLR could be made more sensitive, a broader application space could be covered.

As opposed to a general purpose NLR that must work with targets of opportunity, the insect tracking NLR solved (e) by making a custom tag (a custom target optimized to produce nonlinear backscatter) that guaranteed by design, good wideband coupling coefficients. The insect tracking radar that could transmit a single fundamental tone, f, and look for a $2^{nd}$ order nonlinearity at twice the frequency of the fundamental, or 2f. It could also transmit two fundamental tones $f_1$ and $f_2$ and look for $2^{nd}$ order terms of $2f_1$, $2f_2$, and $f_1+f_2$, which are generally larger than 3rd order terms of $2f_1-f_2$, and $2f_2-f_1$. The third order terms have the advantage that bandwidth of a resonant antenna can cover both the fundamentals and these $3^{rd}$ order intermodulation products. But the $2^{nd}$ order terms have the advantage that they are naturally stronger apart from the antenna affects.

In general, we will use the terms $f_1$ and $f_2$ to refer to the fundamental linear waveform terms that are transmitted (i.e. fundamental-1 and fundamental-2). Therefore, in some cases, $f_1$ and $f_2$ can refer to a tone at a frequency of $f_1$ and $f_2$ respectively, while in other cases, $f_1$ and $f_2$ can refer to two different wideband "fundamental" waveforms, such as a ramping-in-frequency chirp waveform, where $f_1$ might have a different ramp-rate than $f_2$.

Detecting targets that are well shielded and contain a radio, like a cell-phone or WiFi access point, for example, require energy to couple from some entry-point to the rest of the circuitry. In this case the entry-point could be a gap in the shield, or the antenna and filter circuits between the antenna and the rest of the circuitry, or the power cord and filters between the power cord and the rest of the circuitry. As opposed to the insect tracking system, this NLR must solve (e) by designing the transmitted and harmonic frequencies to pass through the entry-point's passband. In this case, a two-tone NLR would transmit fundamental frequencies of $f_1$, $f_2$, and $f_h$ represents a set of one or more harmonic terms to be received. Typically $f_h$ is the set $\{2f_1-f_2, 2f_2-f_1\}$. These two $3^{rd}$ order terms have the property that they are close in frequency to $f_1$ and $f_2$, so that all these frequencies should be able to go through a common entry-point—a solution to (e) from above.

But that leaves problems (a)-(d). These problems are significant since the dynamic range required is beyond that achievable directly with standard wideband hardware. Even though narrowband architectures might provide the needed dynamic range by virtue of ultra-linear passive narrow bandwidth filters (such as LC, SAW, crystal, etc.), they fail at addressing (c) because their narrow bandwidth prevents them from providing the required radar range resolution. Even though ultra high linearity push-pull Class-A or Class AB amplifiers might be operated to give the needed low harmonic and spurious emissions, they fail to address (d) due to their extremely low efficiency at operating points that provide the required linearity.

Math Background

To briefly define a mathematical context, linear and nonlinear responses from objects illuminated by a transmitted signal $s_t(t)$ can be modeled as a Taylor series expansion, $$s_r(t) = \sum_{i=1}^{N} k_i * s_t^i(t), \quad (1)$$

where $s_r(t)$ is the signal reflected by a particular target, $s_t(t)$ is the transmitted signal, $k_i$ are the complex (real & imaginary or magnitude & phase) coefficients for the various powers, and where N sets the number of terms to be included in the expansion. The coefficients $k_i$ are the Taylor series coefficients that model the nonlinear curve that generates the nonlinear harmonics.

Taking the just the third order term (i=3) of a two tone signal, we find the following terms, amplitude coefficients, and phases:

$[a_1*\cos(2\pi f_1 t+\theta_1)+a_2*\cos(2\pi f_2 t+\theta_2)]^3 = (c1\angle\theta_1)\cos(2\pi f_1 t)+(c2\angle\theta_2)\cos(2\pi f_2 t)+(c3\angle(2\theta_1-\theta_2))\cos(2\pi(2f_1-f_2)t)+(c4\angle(2\theta_2-\theta_1))\cos(2\pi(2f_2-f_1)t)+(c5\angle(2\theta_1+\theta_2))\cos(2\pi(2f_1+f_2)t)+(c6\angle(2\theta_2+\theta_2))\cos(2\pi(2f_2+f_1)t)+(c7\angle 3\theta_1)\cos(3f_1)+(c8\angle 3\theta_2)\cos(3f_2)+$   Equation (2)

$c1 = (3/4)*a_1^3 + (3/2)*a_1*a_2^2$
$c2 = (3/2)*a_1^2*a_2 + (3/4)*a_2^3$
$c3 = (3/4)*a_1^2*a_2$
$c4 = (3/4)*a_1*a_2^2$
$c5 = (3/4)*a_1^2*a_2$
$c6 = (3/4)*a_1*a_2^2$
$c7 = a_1^3/4$
$c8 = a_2^3/4$

Note that the output voltage is proportional to the cube of the input voltage for all terms, assuming the magnitude of both tones $f_1$ and $f_2$ are identical. For any particular order, the output frequencies are of the form $n_1 f_1 + n_2 f_2$ where $f_1$ and $f_2$ are the tone frequencies, $n_1$ and $n_2$ are all possible integers and where the sum $|n_1|+|n_2|$ is the order of the term. For example, at the fourth order (i.e., $[a_1*\cos(2\pi f_1 t+\theta_1)+a_2*\cos(2\pi f_2 t+\theta_2)]^4),$ $(|n_1|, |n_2|)$ & $(|n_2|, |n_1|) \in \{(0,2), (1,1), (0,4), (2,2), (1,3)\}$ and the frequencies generated are: $2f_1$, $f_1+f_2$, $f_1-f_2$, $4f_1$, $2f_1+2f_2$, $2f_1-2f_2$, $3f_1+f_2$, $3f_1-f_2$, plus their symmetry pairs (symmetry meaning swapping $f_1$ and $f_2$ where it matters), $2f_2$, $4f_2$, $3f_2+f_1$, $3f_2-f_1$. As another example, at the fifth order, $(|n_1|, |n_2|)$ & $(|n_2|, |n_1|) \in \{(0,1), (0,3), (1,2), (0,5), (1,4), (2,3)\}$ and the frequencies generated are, $f_1$, $3f_1$, $f_1+2f_2$, $2f_1-f_2$, $5f_1$, $4f_1+f_2$, $4f_1-f_2$, $3f_1+2f_2$, $3f_1-2f_2$, and their symmetry pairs $f_2$, $3f_2$, $2f_1-f_2$, $2f_2-f_1$, $5f_2$, $4f_2+f_1$, $4f_2-f_1$, $3f_2+2f_1$, $3f_2-2f_1$.

Illustrative Measured and Simulated Backscatter Data

FIG. 1A is a circuit diagram of a nonlinear diode circuit model 100. As shown in FIG. 1A, the diode circuit 100 includes an AC voltage generator 110, a capacitance 120, a resistance 130, an inductance 140, a DC voltage generator 150, and a diode 160.

The AC voltage generator 110 generates an AC voltage $V_{AC}(t)=A(\sin(2\pi f_1 t)+\sin(2\pi f_2 t))$, where A is a scaling factor, $f_1$ is a first frequency, $f_2$ is a second frequency, and t is time.

The capacitance 120 is connected between the AC voltage generator 110 and the resistance 130.

The resistance 130 is connected between the capacitance 120 and the diode 160.

The inductance 140 and the DC voltage generator 150 are formed in series, and this series circuit is connected in parallel with the diode 160.

The diode 160 is connected in series between the resistance 130 and ground. It is oriented so that current will flow from the resistance 130 to ground.

FIG. 1B the results of a SPICE (Simulation Program with Integrated Circuit Emphasis) simulation of the diode circuit 100 using an HSMS-286 Schottky diode as the diode 160. For this simulation, the amplitude of the AC voltage A=1V, $f_1$=500 MHz, $f_2$=510 MHz, C=20 pF, R=100Ω, L=4 µH, and $V_{DC}$ was set to supply a current of 0.1 µA.

FIG. 1B, shows first and second harmonics 170, 180. The first harmonics (or fundamentals) 170 centers around frequencies $f_1$ and $f_2$, while the second harmonic 180 centers around frequency $(f_1+f_2)$.

FIG. 2 is a graph of the various harmonic levels versus the amplitude of the AC voltage, A, for the diode circuit 100 of FIG. 1. As shown in FIG. 2, there are harmonics at frequencies: $f_2$ 205, $(f_1+f_2)$ 210, $2f_1$ 215, $(2f_2-f_1)$ 220, $(3f_2-2f_1)$ 225, $(4f_2-3f_1)$ 230, $(5f_2-4f_1)$ 235, $(3f_1-f_2)$ 240, $(4f_1-2f_2)$ 245, and $(5f_1-3f_2)$ 245.

FIG. 2 shows how the levels of various harmonic terms change with incident voltage. What the model cannot capture is the affect of coupling. Energy coupling can vary significantly across both wide and small frequency ranges. If we transmit frequencies $f_1$ and $f_2$, the coupling of each into a nonlinear component can be significantly different, and the coupling at the various nonlinear output frequencies can also be significantly different, not only across the wide frequency difference between a fundamental and its $2^{nd}$ harmonic, but also between the $f_1$, $f_2$, $2f_2-f_1$ and $2f_1-f_2$ terms which are relatively close together. For applications like tracking a tag purposefully made to reflect nonlinear terms, like a zero-bias diode connected across an antenna, the $2^{nd}$ order terms at double $f_1$ and $f_2$ and at $f_1+f_2$ are clearly the largest and easiest to detect terms. But if we want to detect a shielded radio, the energy must couple into the radio's circuits through an entry point like the antenna and any filter between the antenna and other circuits. In this case, there is a preference for both the illumination energy and the nonlinear reflected energy to be near the same frequency so both can travel through the entry point with low loss. This makes odd order terms like the $3^{rd}$ order $2f_1-f_2$ term and the $5^{th}$ order $3f_1-2f_2$ term of high interest.

Illustrative Measured Data Showing Nonlinearity of a State-of-the-Art E-PHEMT

FIGS. 3 through 8 illustrate state-of-the-art linearity and power efficiency in an E-PHEMT transistor amplifier. The data was measured on a MiniCircuits PHA-1+E-PHEMT amplifier that only draws 150 mA at 5 V (0.75 W) yet has a 42 dBm IP3 ($3^{rd}$ order intercept point) and 23 dB CP1 (1 dB compression point).

FIG. 3 is a graph 300 showing an adjacent channel leakage ratio (ACLR) versus output power 310 for the E-PHEMPT transistor amplifier. FIG. 4 is a graph showing error vector magnitude (EVM) versus output power for the E-PHEMPT transistor amplifier. In particular, FIG. 4 shows peak EVM versus output power 410, and average EVM versus output power 420.

ACLR and EVM are different metrics that measure linearity. The orthogonal frequency division multiplexing (OFDM) waveform sent to the amplifier is a sum of over 100 equal amplitude tones with a phase of 0, 90, 180, or 270 degrees chosen randomly across all the tones on a periodic basis. The resulting waveform has a high peak-to-average ratio which exercises nonlinearity in the amplifier. If the amplifier and test equipment were linear, there would be no energy in the adjacent channels. But at frequencies close to the fundamentals, the nonlinearity causes frequencies of $(i+1)f_k-if_j+(i+1)f_j-if_k$ to be generated, where i equals integers from 1 to ∞, where N is the number of tones in the transmitted waveform, and where j≠k but otherwise j equals integers from 1 to N and k equals integers from 1 to N. Here, the order of the specific frequency term is 2i+1. These frequencies, being close to the fundamentals, land in adjacent channels. The ACLR measures the impact of nonlinearities because it is the nonlinearities that put energy in adjacent channels.

This high peak-to-average waveform that contains a large number of tones is similar to what the radar receiver circuits experience as they receive a myriad of copies of the transmitted signal delayed by a myriad of different times according to the range to the myriad of different objects. While it is important to manage the transmitter linearity, the fact that the receiver must cope with this high peak-to-average received waveform is why it is all the more important to manage the receiver linearity. The receiver does not have two well behaved tones with a modest 3 dB peak-to-average ratio like the transmitter, but instead, has a myriad of tones to interact nonlinearly. This high peak-to-average similarity is why the ACLR measurement is a good indicator of what the harmonic floor would be in a radar's receiver. The E-PHEMT amplifier described above was designed to provide exceptional ACLR relative to the power it consumes.

Note that at low output powers i.e. 6 dB or more below the 1-dB-compression-point (CP1), the ACLR degrades 4 dB per 1 dB increase in output power. Multiple techniques, both individually and in combinations, are typically applied in receivers to improve the linearity so that nonlinear terms produced in the receiver not to mask a received harmonic response from a target. These include simply running the amplifier far from its CP1 (i.e. high backoff), using multi-amplifier circuits (e.g. Doherty, balanced, etc), using pre-distortion circuits, and using circuit topologies with negative feedback. These techniques are effective for applications that have modest needs, like OFDM communications, because they work in a domain where they bring a severe nonlinearity down to a modest linearity, like −20 dBc harmonics down to −40 dBc. They do not work well, however, in a domain where nonlinear terms need to be over 90 dB down from the fundamentals, as is the case with NLR. High backoff is used on many OFDM systems due to their high peak-to-average-ratio (PAR). The E-PHEMPT amplifier mentioned above, with one of the best linearity-per-watt metrics available in today's technology, would meet a −100 dBc harmonic specification (or ACLR) at an output power of 0 dBm. Note that scaling this efficiency to a transmitter shows that doing so would require over 75 kilowatts of prime power to generate 100 W of RF power. These above facts illustrate the difficulty of solving problems (a)-(d) above.

FIG. 5 is a power spectrum plot, at an output power of 0 dBm, covering a desired channel, two adjacent channels below the desired channel, and two adjacent channels above the desired channel. The 0 dBm ACLR is simple the ratio of the power in this plot integrated over an adjacent channel relative to the power in this plot integrated over the desired channel.

FIG. 6 is a power spectrum plot, at an output power of 10 dBm, covering a desired channel, two adjacent channels below the desired channel, and two adjacent channels above the desired channel. This plot is used to compute the 10 dBm ACLR.

FIG. 7 is a power spectrum plot, at an output power of 15 dBm, covering a desired channel, two adjacent channels below the desired channel, and two adjacent channels above the desired channel. This plot is used to compute the 15 dBm ACLR.

FIG. 8 is a power spectrum plot, at an output power of 18 dBm, covering a desired channel, two adjacent channels below the desired channel, and two adjacent channels above the desired channel. This plot is used to compute the 18 dBm ACLR.

SUMMARY OF THE INVENTION

A nonlinear radar (NLR) including: transmitter circuitry configured to generate a plurality of base transmission pulses at a base transmission power; a switchable transmitter power-modifying circuit configured to receive the plurality of base transmission pulses, and for each of the base transmission pulses, to select a transmitter power-modification path from a first transmitter power-modification path that modifies the base transmission power to a first transmission power, and a second transmitter power-modification path that modifies the base transmission power to a second transmission power, the second transmission power being greater than the first transmission power; a transmitter antenna configured to transmit the power-modified transmission pulses toward a reflective object; a receiver antenna configured to receive a plurality of base reflected pulses at differing base reflected powers; and a switchable receiver power-modifying circuit configured to receive the plurality of base reflected pulses, and for each of the base reflected pulses, to select a receiver power-modification path from a first receiver power-modification path that modifies the base reflected power to a first receiver power, and a second receiver power-modification path that modifies the base reflected power to a second receiver power, the first receiver power being greater than the second receiver power; receiver circuitry configured to process the power-modified reflected pulses, wherein each base reflected pulse corresponds to a corresponding power-modified transmission pulse that has been reflected off the reflective object, a transmission ratio of the first transmission power to the second transmission power is the same as a receiver ratio of the second receiver power to the first receiver power, the receiver circuitry is configured to subtract one of a first power-modified reflected pulse and a second power-modified reflected pulse from the other of the first power-modified reflected pulse and the second power-modified reflected pulse, the first and second power-modified reflected pulses are based on identical base transmission pulses, the first power-modified reflected pulse is at the first receiver power, and is based on a first power-modified transmission pulse that was transmitted at the first transmission power, and the second power-modified reflected pulse is at the second receiver power, and is based on a second power-modified transmission pulse that was transmitted at the second transmission power.

The two transmitter power-modifying paths may include first and second transmitter power-modification paths, the first transmitter power-modification path may pass the base transmission signal unmodified as the power-modified transmission signal, and the second transmitter power-modification path may reduce the transmission power of the base transmission signal by a first power reduction to generate the power-modified transmission signal.

The transmitter antenna and the receiver antenna may be the same antenna.

The transmission ratio and the receiver ratio may both be 0.5.

The nonlinear radar may further include a timing control circuit configured to control operation of the switchable transmitter power-modifying circuit and the switchable receiver power-modifying circuit.

The switchable transmitter power-modifying circuit may further comprise: a first transmitter switch configured to select the selected transmitter power-modification path, receive the base transmission pulse from the transmitter circuitry, and pass the base transmission pulse from the transmitter circuitry to the selected transmitter power-modification path; the two transmitter power-modification paths, each configured to modify the transmission power of the base transmission pulse by one of two different power-modification values, respectively, to generate the power-modified transmission pulse; and a second transmitter switch configured to select the selected transmitter power-modification path, to receive the power-modified transmission pulse from the selected transmitter power-modification path, and to pass the power-modified transmission pulse from the selected transmitter power-modification path to the transmitter antenna.

The switchable receiver power-modifying circuit may further comprise: a first receiver switch configured to select the selected receiver power-modification path, receive the base reflected pulse from the receiver antenna, and pass the base reflected pulse from the receiver antenna to the selected receiver power-modification path; the two receiver power-modification paths, each configured to modify the received power of the base reflected pulse by one of the two different power-modification values, respectively, to generate the power-modified reflected pulse; and a second transmitter switch configured to select the selected receiver power-modification path, to receive the power-modified reflected pulse from the selected receiver power-modification path, and to pass the power-modified reflected pulse from the selected receiver power-modification path to the receiver circuitry.

The switchable transmitter power-modifying circuit may be configured to regularly alternate between selecting each of the two available transmitter power-modification paths.

A method of detecting a remote object is provided, including: generating a plurality of base transmission pulses at a same base transmission power; selectively modifying the base transmission power of each of the plurality of base transmission pulses to each become one of a first transmission power and a second transmission power, the second transmission power being greater than the first transmission power, in order to generate a plurality of power-modified transmission pulses; transmitting the plurality of power-modified transmission pulses toward a reflective object;

receiving a plurality of base reflected pulses at differing base reflected powers; selectively modifying the base reflected power of each of the plurality of base reflected pulses to each become one of a first receiver power and a second receiver power, the first receiver power being greater than the second receiver power, in order to generate a plurality of power-modified reflected pulses; and subtracting one of a first power-modified reflected pulse and a second power-modified reflected pulse from the other of the first power-modified reflected pulse and the second power-modified reflected pulse wherein each base reflected pulse corresponds to a corresponding power-modified transmission pulse that has been reflected off the reflective object, a transmission ratio of the first transmission power to the second transmission power is the same as a receiver ratio of the second receiver power to the first receiver power, the first and second power-modified reflected pulses are based on identical base transmission pulses, the first power-modified reflected pulse is at the first receiver power, and is based on a first power-modified transmission pulse that was transmitted at the first transmission power, and the second power-modified reflected pulse is at the second receiver power, and is based on a second power-modified transmission pulse that was transmitted at the second transmission power.

The two transmitter power-modifying factors may include first and second transmitter power-modification factors, the first transmitter power-modification factor may make a second power of the power-modified transmission signal equal to a first power of the base transmission signal, and the second transmitter power-modification factor may make the second power of the power-modified transmission signal equal to the first power of the base transmission signal reduced by a power-reduction factor.

In the operation of selectively modifying a transmission power of each of the plurality of base transmission pulses, the operation regularly may alternate between selecting each of the two available transmitter power-modification factors.

The transmission ratio and the receiver ratio may both be 0.5.

BRIEF DESCRIPTION OF THE DRAWINGS

The accompanying figures, in which like reference numerals refer to identical or functionally similar elements, and which together with the detailed description below are incorporated in and form part of the specification, serve to further illustrate an exemplary embodiment and to explain various principles and advantages in accordance with the present invention.

DETAILED DESCRIPTION

Figure 1A:
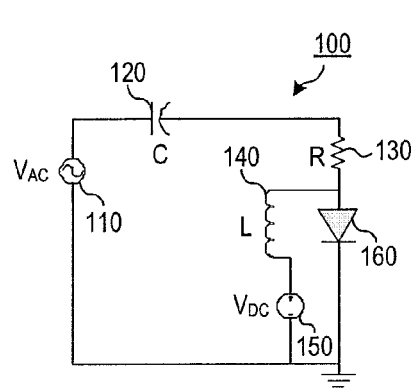
FIG. 1A is an example circuit diagram that generates non-linear radar backscatter.
Figure 1B:
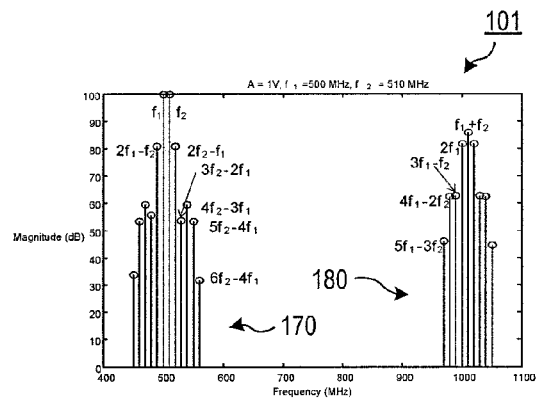
FIG. 1B is a graph showing the non-linear backscatter spectrum from the circuit of FIG. 1A.
Figure 2:
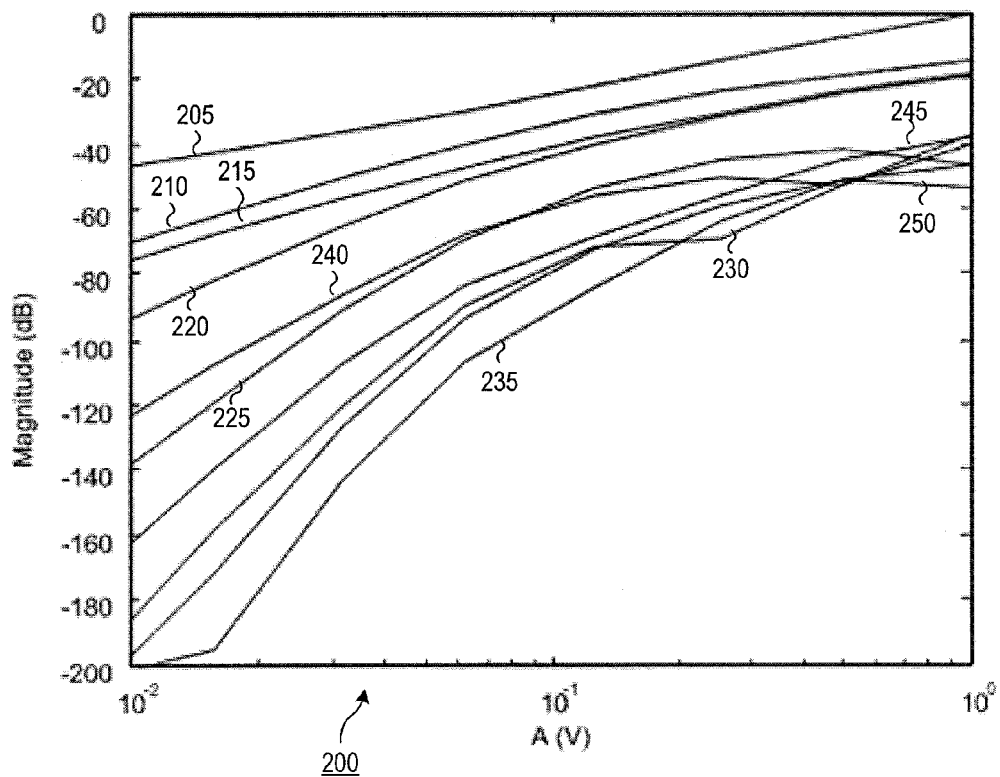
FIG. 2 is a graph of harmonic levels versus incident voltage for the circuit of FIG. 1A.
Figure 3:
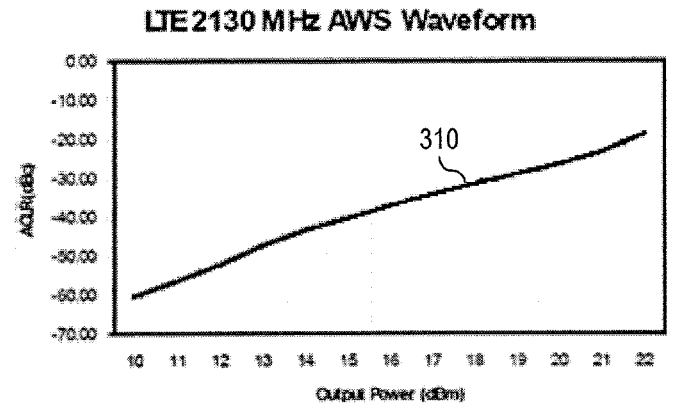
FIG. 3 is a graph showing an adjacent channel leakage ratio (ACLR) versus output power in a PHEMPT transistor amplifier.
Figure 4:
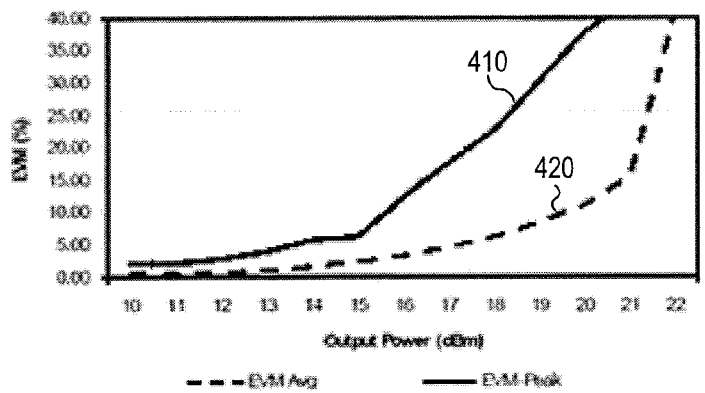
FIG. 4 is a graph showing error vector magnitude (EVM) versus output power in a PHEMPT transistor amplifier.
Figure 5:
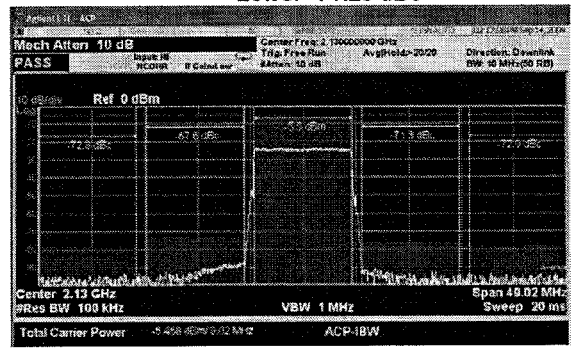
FIG. 5 is a plot of the power spectrum of a PHEMPT transistor amplifier across the desired channel and across two adjacent channels above and below the desire channel at an output power level of 0 dBm, which is used to compute the ACLR at a 0 dBm output level.
Figure 6:
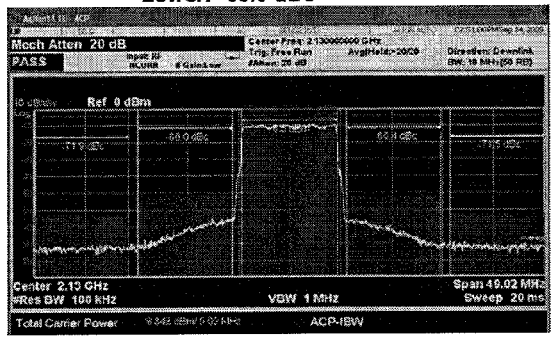
FIG. 6 is a plot of the power spectrum of a PHEMPT transistor amplifier across the desired channel and across two adjacent channels above and below the desire channel at an output power level of 10 dBm, which is used to compute the ACLR at a 10 dBm output level.
Figure 7:
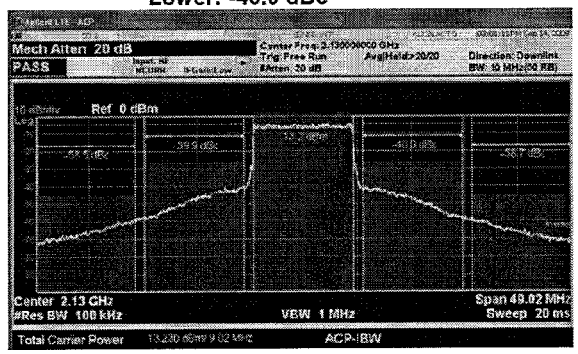
FIG. 7 is a plot of the power spectrum of a PHEMPT transistor amplifier across the desired channel and across two adjacent channels above and below the desire channel at an output power level of 15 dBm, which is used to compute the ACLR at a 15 dBm output level.
Figure 8:
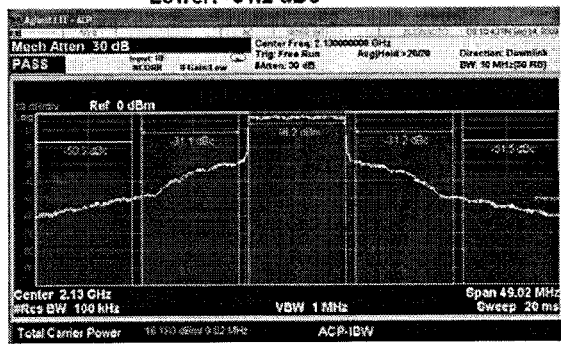
FIG. 8 is a plot of the power spectrum of a PHEMPT transistor amplifier across the desired channel and across two adjacent channels above and below the desire channel at an output power level of 18 dBm, which is used to compute the ACLR at a 18 dBm output level.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, may be supported with or in integrated circuits (ICs), such as dynamic random access memory (DRAM) devices, static random access memory (SRAM) devices, or the like. In particular, they may be implemented using CMOS transistors. It is expected that one of ordinary skill, notwithstanding possibly significant effort and many design choices motivated by, for example, available time, current technology, and economic considerations, when guided by the concepts and principles disclosed herein will be readily capable of generating such ICs with minimal experimentation. Therefore, in the interest of brevity and minimization of any risk of obscuring the principles and concepts according to the present invention, further discussion of such ICs will be limited to the essentials with respect to the principles and concepts used by the exemplary embodiments.

A system and method is disclosed to make a radar that can measure and exploit nonlinear backscatter that is below the harmonic and spurious floor of the radar hardware itself. A system and method is disclosed to cancel the radar's internally generated harmonics—in both the transmitter and receiver—to achieve ultra high sensitivity to nonlinearities specific to an object illuminated by the radar. Uses are disclosed for a nonlinear radar (NLR) enabled by the ultra high sensitivity gained by the disclosed system and method. The disclosed system and method allows the non-radar to be smaller, lower power, and more efficient—thus offering major size weight and power (SWaP) benefits. Both the sensitivity and SWaP benefits are enabling features relative to high value uses for a NLR. For example, detection and characterization of nonlinear backscatter provides a capability to detect and discriminate targets based on their electronics content. Embodiments combining different categories of features allow low to high performance and low to high cost in order to optimize different applications. There are three categories of methods that can be combined in various ways: (1) making the NLR immune to its self-generated nonlinear terms, (2) improving the ability to isolate different order linear and nonlinear terms yet at the same time offer wide bandwidth for high range resolution, and (3) improving the baseline linearity of the radar.

Exemplary Uses

The capability described above has many use cases. One extremely high value use case is finding electronic devices associated with insurgents or missing people hidden in rough terrain. Here, the voluminous background clutter obscures signatures connected with humans, who are often carrying electronic devices like hearing aids, cell-phones, cameras, pacemakers, watches, LED flashlights, radios, walkie-talkies, computers, etc. Another extremely high value use case is finding improvised explosive devices (IEDs). Again, these devices are purposely deployed in voluminous background clutter settings that obscure them. Another high value use case is augmentation of airborne synthetic aperture radar (SAR) ground moving target indicator (GMTI) dismount detection radars (DDRB). In this case, not only is clutter a problem, but discrimination between animals, humans, vehicles, etc. is required. In all of these applications, the capability to illicit and receive nonlinear responses in addition to the normal responses could add invaluable features or signatures for performing high certainty detection and discrimination.

One such feature is a set of complex amplitudes, $\alpha$, (magnitude and phase) for one or more different order response terms—such as $S_1 = \{\alpha_{f_1}, \alpha_{2f_1}, \alpha_{2f_1-f_2}, \alpha_{3f_1-2f_2}\}$ which comprises a set with a first, second, third, and fifth order term respectively.

Another such feature set, say $S_2$, could capture attributes related to how each of the terms in $S_1$ change with time. The features in $S_2$ could be comprised of spectral terms, time related terms, or multi-scale terms from a joint time frequency analysis (JTFA). Features could also include the correlation of these features across the different order terms included in the set. The modulation spectrum, for example, is narrow or non-existent for a cell-phone that is turned off, because the various harmonic terms are not changing over time. In this case, slow and narrowband modulation would still be caused by motion of the phone, for example, if the phone was being carried by someone. If the cell-phone is turned on, however, diodes and transistors are biased partially on with quickly changing signals going through—being switched on and off at a high rate by its processor. This activity modulates the nonlinear backscatter causing the spectrum around the nonlinear terms to be much broader. Information about the phone's motion all the way to identification of the type of phone, the software version running on it, and what mode it is operating might be revealed by analyzing the modulation of the nonlinear terms. Because of the information that can be obtained by analyzing this modulation, it is advantageous for the NLR to be able to capture nonlinear terms on short time scales. Since short time scales means short signal integration durations, such functionality requires extremely high sensitivity to nonlinear terms.

Another use of the disclosed NLR is battle damage assessment. In this case, the NLR isolates electronic systems versus other clutter and analyzes the nonlinear signatures before and after an attack. Changes in those signatures, like the modulation disappearing or not, indicates that an object containing electronics was either disabled, destroyed, or not harmed.

Another use is a non-invasive diagnostic tool, to remotely measure, bias conditions in an electronic system. This use takes advantage of the fact that the nonlinear response is highly dependent on the bias conditions. A system could be set up to remotely measure the bias, and then remotely adjust the bias via a wired or wireless link, to optimize the nonlinear response for a particular function.

Another use case is in failure analysis. The signatures collected by the NLR enable determination of the stress level of various components since the nonlinear response changes when diode and transistor junctions change by being partially damaged, for example, by cosmic rays, or occasional high voltage spikes.

Another use is to remotely read information flowing through an electronic system. For example, rather than trying to monitor emissions from a keyboard or a disk drive or any other piece of equipment—emissions that are typically coded to make them difficult to read—the NLR could monitor the modulation on the nonlinear terms that are connected to the underlying transistors and connect the modulation features to specific key presses or other data.

System and Method

The disclosed system and method uses a combination of one or more methods listed below. The preferred embodiment depends on the needs of the specific application. Some extremely cost sensitive applications might use on one method, while other applications that are extremely performance driven might use all methods. The flexibility to combine the methods describe allow broad applicability across many different uses.

(I) System and Method to Provide Sensitivity Below the Harmonic Floor of the Radar The first system and method allows: (1) digital cancelation of everything except for nonlinearity in a target's response and (2) high integration-gain to be applied to this isolated nonlinear backscatter. In other words, all linear and nonlinear effects in both the transmitter circuitry and the receiver circuitry are canceled. For example, a SAR image, made with the radar operating in this mode, would show only objects that had a nonlinear response—and no natural clutter or returns from passive (i.e. linear) objects. The disclosed system and method solves the preeminent practical problems with NLR: (1) that transmitter and receiver hardware is always nonlinear to some degree, and especially so when trying to design for low SWaP or for wide bandwidth (a necessity for high range resolution); and (2) that greater sensitivity is required to detect the tiny nonlinear backscatter signal and any modulation it carries (i.e. so that the operational range is extended enough to be useful with a relatively small transmitter). The examples discussed above refer to a radar where integration gain was needed to extend the range, but could not be done because the backscatter signal was below the harmonic floor of the radar. This integration gain is enabled by (and cannot be done without) the cancelation of the nonlinear terms generated in the radar itself—and particularly, those associated with the receiver. A system and method is disclosed that does exactly that—it cancels nonlinear terms generated in the radar itself.

The system and method is comprised of a means to change the gains in the transmit path and in the receive path synchronously, such that the total gain remains fixed, or nearly fixed according to the manufacturing tolerances of 970 and 975. A control system that includes signal processing surrounds the radar's RF hardware to provide robust harmonic-radar functionality in a small complete system, that appears externally like a simple standard radar, but one with the ability to isolate and measure nonlinear terms with high sensitivity.

Figure 9:
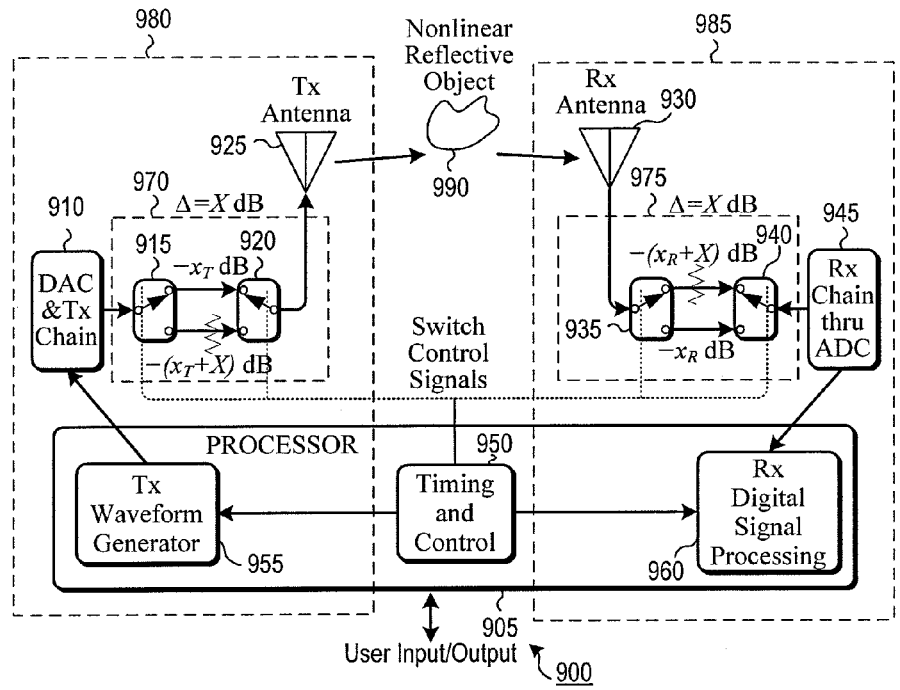
FIG. 9 is a block diagram showing a radar system able to null its own nonlinearities according to disclosed embodiments.

FIG. 9 is a block diagram showing a self-nonlinearity nulling radar system 900 according to disclosed embodiments. As shown in FIG. 9, the radar system 900 includes a processor 905, a digital-to-analog converter (DAC) and transmitter chain 910, a set of two or more selectable paths with different gains 970 shown with two paths through first and second transmitter switches 915, 920, a transmit (Tx) antenna 925, a receiver (Rx) antenna 930, a set of two or more selectable paths with different gains 975 shown with two paths through first and second receiver switches 935, 940, and a receiver chain and analog-to-digital converter (ADC) 945. The processor 905 further contains a timing and control element 950, a transmit waveform generator 955, and a receiver digital signal processor (DSP) 960.

The transmit waveform generator 955, the DAC and transmitter chain 910, the set of two or more selectable transmit paths with different gains 970, and the transmit antenna 925 form a transmitter 980 in the radar system 900. Likewise, the receiver antenna 930, the set of two or more selectable receive paths with different gains 975, the receiver chain and ADC 945, and the receiver DSP 960 form a receiver 985 in the radar system 900.

The processor 905 operates to process digital received signals, and to generate digital transmit signals. It generates the switch control signals that are provided to the set of two or more selectable transmit paths with different gains 970 and the set of two or more selectable receive paths with different gains 975, so that switch operations are properly synchronized with the received signals and the transmit signals.

The DAC and transmitter chain 910 converts a digital transmit signal generated by the transmitter waveform generator 955 into an analog transmit signal, and prepares the analog transmit signal for transmission.

The set of two or more selectable transmit paths with different gains 970 and the set of two or more selectable receive paths with different gains 975 are controlled by switch control signals sent by the timing and control element 950 such that the total gain is fixed. For example, in a first switch control state, the switch control signals set 970 (the set of two or more selectable transmit paths with different gains) to the higher power path (the $-x_T$ dB path as shown in FIG. 9), while at the same time, the switch control signals set 975 (the set of two or more selectable receive paths with different gains) to the lower power path (the $-(x_T+X)$ dB path as shown in FIG. 9) so that the total path gain is $-(x_T+x_R+X)$ dB. In a second switch control state, the switch control signals set 970 (the set of two or more selectable transmit paths with different gains) to the lower power path (the $-(x_T+X)$ dB path as shown in FIG. 9), and at the same time the switch control signals set 975 (the set of two or more selectable receive paths with different gains) to the higher power path (the $-x_R$ dB path as shown in FIG. 9) so that the total path gain is $-(x_T+x_R+X)$ dB. Thus it is seen that in both switch control states, the total path gain is fixed at $-(x_T+x_R+X)$ dB since the high-to-low power ratio between the two paths in 970 and 975 are set to the same value, which in this example is X dB. While FIG. 9 is shown with two paths for simplicity and clarity, more paths could be used, where the principle is that the pairs of paths are selected that maintain a fixed total gain, yet have a different transmit power.

The transmit antenna 925 serves to transmit a signal that is reflected off a non-linear reflective object 980 and then received by the receiver antenna 930. As is well known in the radar art, antennas 925 and 930 could be replaced with a single antenna and a circulator or switch network that would provide the separate connections to the transmitter and receiver.

The receiver chain and ADC 945 operates to process the signal received at the receive antenna 930, thereby generating an analog received signal. It also operates to convert the analog received signal to a digital received signal.

The timing and control element 950 controls the operation of the transmit waveform generator 955, the receiver DSP 960, the set of two or more selectable transmit paths with different gains 970, and the set of two or more selectable receive paths with different gains 975. It encompasses this through the use of switch control signals, clock signals, transmitter control signals, and receiver control signals.

The transmit waveform generator 955 operates to generate the digital transmit signal waveforms based on timing and control signals received from the timing and control element 950, and based on the waveform design and timing supplied via the user interface.

The receiver DSP 960 operates to process the digital received signal based on timing and control signals received from the timing and control element 950, and based on the algorithm design and timing supplied via the user interface.

The radiated power and the receiver gain changes synchronously from pulse to pulse such that the loop gain remains fixed. By virtue of the loop gain remaining fixed, the receiver chain through ADC 945 (including all its amplifiers, mixers, samplers, etc.) always (on all pulses) receives identical levels for all normal (linear) backscatter signals. In other words, as far as what it sees, nothing changes from pulse-to-pulse. Since nonlinear terms in the transmitter 980 always see the same loop gain, the receiver 985 does not see them change from pulse-to-pulse either. A nonlinear responses from an illuminated object 990, however, do change from pulse-to-pulse. Since nonlinear backscatter does not change linearly with the changes in the transmitted power, the nonlinear backscatter alone will change in the receiver circuits and ADC 945 from pulse-to-pulse between high and low power transmitted pulses. Since the nonlinear terms are extremely low-power relative to all the other normal signals that are arriving, its presence typically does not impact the nonlinear terms of the amplifiers, mixers and ADC in the receiver chain 945. By subtracting low transmit power pulses from high transmit power pulses, only non-linear backscatter returns remain. All of the radar's internally generated nonlinear terms, in both the transmitter and the receiver, are canceled.

The digital timing and control element 950 provides all the control signals necessary to allow the Rx DSP 960 to perform any required pulse compression or matched filter processing plus the high power pulses to low power pulses subtraction functions. The digital timing and control element 950 could be implemented using discrete logic, or a field programmable gate array (FPGA), or a micro-processor programmed to perform the functions.

A key fact that must be appreciated is that the receiver circuits and ADC 945 have high peak-to-average random signals prone to excite nonlinear terms as described in above with respect and FIGS. 3 through 8. Furthermore, the radar's internal nonlinear terms around one target at one range are completely different from the radar's internal nonlinear terms around a different target at a different range. The radar's internal nonlinear terms are time-varying in response to the time-varying myriad of signals arriving. While pre-distortion types of techniques might work fine for a single target, or for a pre-known transmit signal, such as a highly controlled test instrument connect to a device under test, it does not work at all in this time-varying environment. The disclosed approach solves this problem by intentionally keeping the internal nonlinearities in the ADC and receiver circuits 945 fixed, while causing an object's nonlinearity to change. This fact allows all system nonlinearities to be nulled while leaving the nonlinear response of an illuminated object 990, where it can now be detected with high sensitivity. Moreover, unlike using very high rejection narrowband filters to isolate nonlinear terms, this cancelation approach can occur over wide bandwidths. It works with arbitrary waveforms. In addition to narrowband waveforms, it can use wideband waveforms such as chirp, QAM coded, or transient pulses. As a result, it allows a non-linear radar to quickly obtain high range resolution as well as high sensitivity performance.

More specifically, suppose the paths shown in 970 and 975 change the power by half (i.e. 0.5 or X≈3 dB). For the $k^{th}$ order backscatter term, the backscatter is $s_k(t)|_{LowPower}$ volts/meter. When the transmitter's path is the higher power path, the backscatter from the high power pulse is:

$$s_k(t)|_{HighPower} = (10^{X/20})^k s_k(t)|_{LowPower} = \sqrt{2}^k s_k(t)|_{LowPower} \text{ volts/meter.} \quad (3)$$

So $2^{nd}$ order terms go up 6 dB or a factor of $\sqrt{2}^2$ i.e. ($2s_2(t)$ volts/m),
$3^{rd}$ order terms go up 9 dB or a factor of $\sqrt{2}^3$ i.e. ($2.828s_3(t)$ volts/m), and
$5^{th}$ order terms go up 15 dB or a factor of $\sqrt{2}^5$ i.e. ($5.657s_5(t)$ volts/m).

At the receiver, the low power path is selected on the high power pulses, which cuts the received power in half (again, by 0.5 or X≈3 dB) or a voltage factor of $1/\sqrt{2}$. Therefore, the signal levels at the LNA would be, for the high power pulses:

$$h_r + s_1 + \sqrt{2}s_2 + 2s_3 + 4s_5, \quad (4)$$

and for the low power pulses:

$$h_r + s_1 + s_2 + s_3 + s_5. \quad (5)$$

By subtracting equation (5) from equation (4) we get, $$0.414s_2 + s_3 + 3s_5 \quad (6)$$

which has canceled all of the radar's internal harmonics and all linear responses from targets illuminated by the radar. Therefore, the radar is sensitive only to nonlinear backscatter.

Depending on the application, the system can be dominated by either external noise, or internal noise. In order to optimize the signal to noise ratio for different applications, a sequence of N pulses can be sent, where M out of N are low power. For example, suppose that in a particular application the noise was primarily external. We could let M=2 and N=3 so that two low power pulses were sent for each high power pulse. By averaging the received low power signals and subtracting that average from the high power signal, the same cancelation of linear backscatter and the radar's internal harmonics occurs. But the signal-to-noise-ratio (SNR) of the canceled terms is now the same, since both the high power signal and the averaged signals being subtracted were produced by an identical transmit power.

To characterize the nonlinear behavior at more power levels, the two position switches could be replaced with multiple position switches allowing analysis at multiple field strengths incident on the nonlinear target.

In "A Vector Intermodulation Analyzer Applied to Behavioral Modeling of Nonlinear Amplifiers With Memory," by Aaron Walker, Michael Steer, and Kevin G. Gard, IEEE TRANSACTIONS ON MICROWAVE THEORY AND TECHNIQUES, VOL. 54, NO. 5, May 2006, pp 1991-1999, a method of achieving high sensitivity measurements of nonlinear terms generated by a device under test (DUT) is given, and is shown as circuit 1000 in FIG. 10.

Figure 10:
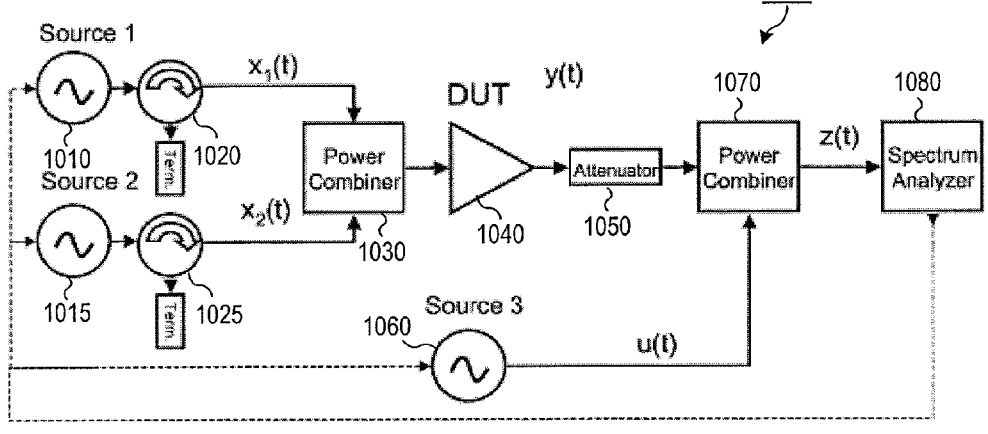
FIG. 10 is a block diagram for a measurement system that subtracts the linear terms from the output of a device-under-test (DUT) so that conventional equipment has the dynamic range necessary to measure the non-linear terms generated by the DUT.

As shown in FIG. 10, circuit 1000 includes first and second sources 1010, 1015, first and second isolators 1020, 1025, a first power combiner 1030, a device-under-test (DUT) 1040, an attenuator 1050, a third source 1060, a second power combiner 1070, and a spectrum analyzer 1080. The third source 1060 is phase locked and adjusted to duplicate the amplitude and be 180 degrees out of phase with the linear terms coming out of the DUT 1040 after passing through attenuator 1050. As a result, the linear terms are canceled in the second power combiner 1070.

The problem with this circuit is that it only works as a test instrument which has a well known signal going into the DUT, which is opposite of the radar receiver. The radar's receiver has a myriad of unknown signals coming from a myriad of reflecting objects that are in its view. As a result, there is no a priori knowledge on how to make a third source 1060 that duplicates exactly, all the linear backscatter that a radar sees. Furthermore, the nulling of the linear terms excludes the spectrum analyzer as well as any nonlinear terms generated in the first source 1010 and the second source 1025.

As the authors of "A Vector Intermodulation Analyzer Applied to Behavioral Modeling of Nonlinear Amplifiers With Memory" say, "the distortion in the analyzer front-end can overwhelm the DUT response." The disclosed methods allow distortion in the analyzer and the sources to be nulled, so that measurements of non-linearities in the DUT can be made with enhanced sensitivity and accuracy. In this case, one embodiment of the disclosed invention would be to add a first switched attenuator prior to the DUT 1040 and a second switched attenuator either after the DUT 1040 or after the attenuator 1050. As described above, the spectrum analyzer would take a first data set with the first attenuator set at 0-dB and the second attenuator set at X-dB, and then the spectrum analyzer would take a second data set with the first attenuator set at X-dB and the second attenuator set at 0-dB, and then the first and second data sets would be subtracted to reveal the nonlinear terms of the DUT alone.

Unlike the original circuit, nonlinear terms in sources 1010 and 1015, the circulators 1020 and 1025, the power combiners 1030 and 1070, and the spectrum analyzer 1080 would now be nulled. Furthermore, by making sources 1010, 1015, and 1025 capable of producing the A-B-C waveforms or the chirp waveforms described in the following sections, additional capability could be gained.

(2) System and Method to Design and Use Multi-Pulse Waveforms Optimized for Wideband Nonlinear-Radar Sensitivity A second system and method may also be combined with the other methods disclosed here to build a nonlinear radar (NLR) better optimized for a particular application. This second system and method involves multi-pulse waveform design and use. In this system, the multi-pulse received signals can be combined in the receiver to isolate nonlinear versus linear terms. It might be compared to a complementary coded radar. A complementary coded radar uses two pulse waveforms. One pulse uses Code-A, and a second pulse uses Code-B. Codes A and B are designed so that all the sidelobes from Code-A are inverted relative to the sidelobes of Code-B. When the backscatter from the Code-A pulse is added to the backscatter from the Code-B pulse, all the sidelobes are canceled, leaving only the desired response. In the present invention, the multi-pulse waveform is comprised of three pulse waveforms, and the waveforms are not designed to eliminate sidelobes, but are designed to isolate linear and nonlinear terms so they can be identified and accurately measured.

Equation (2) above shows how the phase of the nonlinear terms are modulated by the phasing of the fundamental transmitted tones. By changing the phase relationships in the waveforms from pulse to pulse or within a pulse, the ability to isolate different order terms can be gained.

For example, let the phase of the fundamental frequencies $f_1$, $f_2$ be $\theta_1$, $\theta_2$ respectively. Therefore the phase of harmonics $h_1$, $h_2$ is $2\theta_1-\theta_2$, $2\theta_2-\theta_1$, where $h_1$ is the $2f_1-f_2$ term and $h_2$ is the $2f_2-f_1$ term. Let $\alpha_{f_1}$, $\alpha_{f_2}$, $\alpha_{h_1}$, $\alpha_{h_2}$ be the complex coefficients for the backscattered signals from a target. Assign phases for the frequencies in for pulse-A, pulse-B, and pulse-C as $(\theta_1,\theta_2)=(0,0),(0,90),(90,0)$ respectively. Now we can set up a set of equations for sums and differences between the different pulses (i.e. A, B, and C) as, $$\begin{bmatrix} A+B \\ A+C \\ A-C \\ A-B \end{bmatrix} = \begin{bmatrix} 2\angle 0 & \sqrt{2}\angle 45 & \sqrt{2}\angle -45 & 0 \\ \sqrt{2}\angle 45 & 2\angle 0 & 0 & \sqrt{2}\angle -45 \\ \sqrt{2}\angle -45 & 0 & 2\angle 0 & \sqrt{2}\angle -45 \\ 0 & \sqrt{2}\angle -45 & \sqrt{2}\angle -45 & 2\angle 0 \end{bmatrix} \begin{bmatrix} \alpha_{f_1} \\ \alpha_{f_2} \\ \alpha_{h_1} \\ \alpha_{h_2} \end{bmatrix}. \quad (7)$$

By virtue of the choice of phases for pulses A, B, and C, note that any backscatter term can be nulled or doubled, and the 4×4 matrix invertible. That being the case, we can isolate each term $\alpha_{f_1}$, $\alpha_{f_2}$, $\alpha_{h_1}$, $\alpha_{h_2}$ as $$\begin{bmatrix} \alpha_{f_1} \\ \alpha_{f_2} \\ \alpha_{h_1} \\ \alpha_{h_2} \end{bmatrix} = \quad (8)$$

$$\begin{bmatrix} 0.398\angle -55 & 0.244\angle 67.2 & 0.441\angle 52 & 0.48\angle -145 \\ 0.244\angle 67.2 & 0.398\angle -55 & 0.48\angle -145 & 0.441\angle 52 \\ 0.441\angle 52 & 0.48\angle -145 & 0.152\angle 122.6 & 0.441\angle 17.8 \\ 0.48\angle -145 & 0.441\angle 52 & 0.441\angle 17.8 & 0.152\angle -122.6 \end{bmatrix} \begin{bmatrix} A+B \\ A+C \\ A-C \\ A-B \end{bmatrix}.$$

By this method, even when the spectrum of these terms is overlapping, the terms can be isolated and accurately measured. Furthermore, if the hardware does not provide exactly the prescribed phases for the three pulses, the signal processor can adapt with a different inversion matrix to isolate the different order terms.

Figure 11:
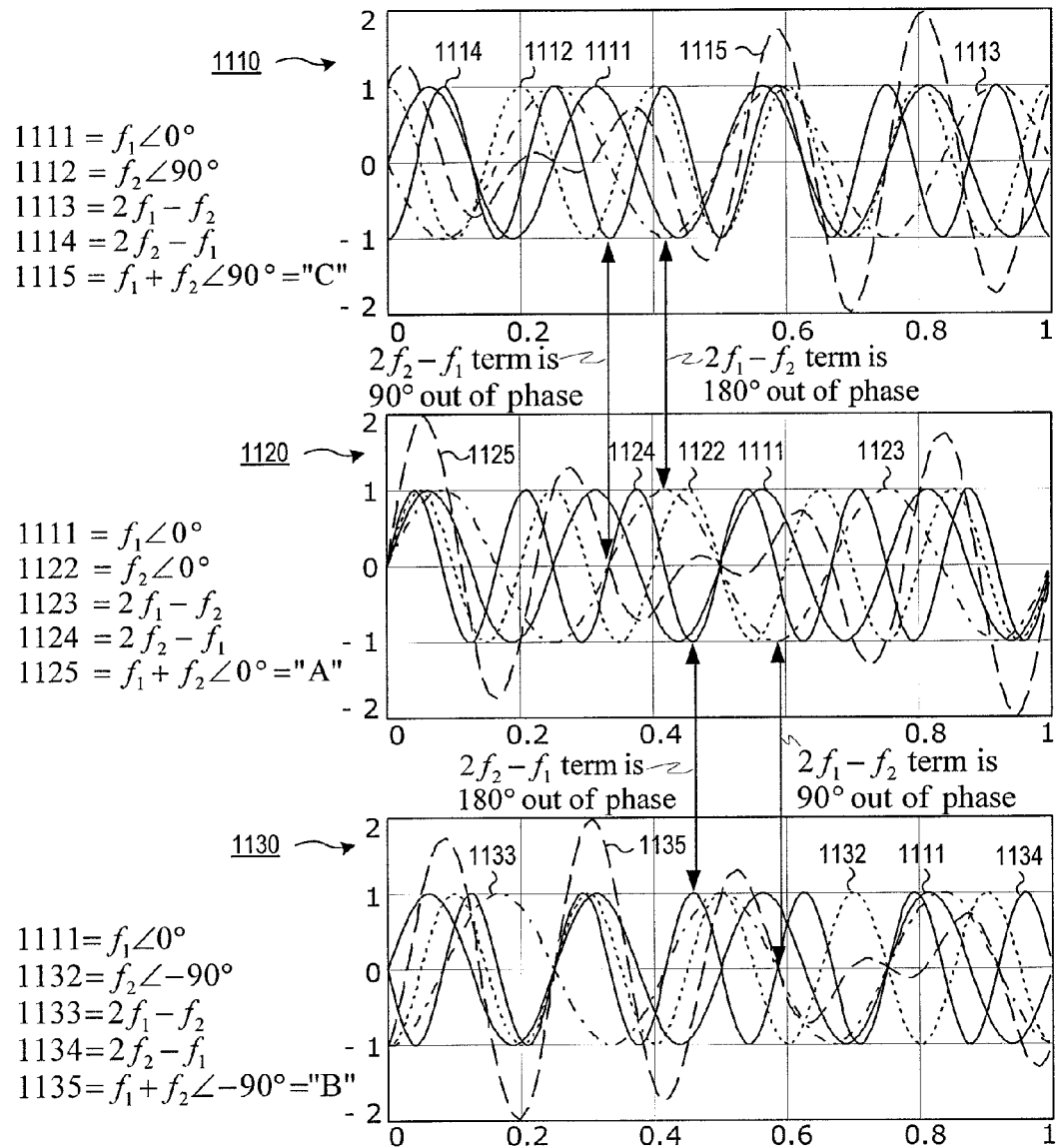
FIG. 11 shows voltage versus time plots for three waveforms that allow linear and nonlinear terms to be isolated and measured.

FIG. 11 is a graph illustrating an example construction of a "A", "B", and "C" waveforms, according to a disclosed embodiment. As shown in FIG. 11, the graph includes a first graph portion 1120, a second graph portion 1130, and a third graph portion 1110.

The first graph portion 1120 shows the "A" waveform 1115, along with its components, 1111 (4 cycles of the $f_1\angle 0°$ term) and 1122 (five cycles of the $f_2\angle 0°$ term), plus the resulting third order harmonic terms 1123 (3 cycles of the $2f_1+f_2$ term) and 1124 (six cycles of the $2f_2+f_1$ term).

The second graph portion 1130 shows the "B" waveform 1135, along with its components, 1111 (4 cycles of the $f_1\angle 0°$ term) and 1132 (five cycles of the $f_2\angle -90°$ term), plus the resulting third order harmonic terms 1133 (3 cycles of the $2f_1+f_2$ term) and 1134 (six cycles of the $2f_2+f_1$ term).

The third graph portion 1110 shows the "C" waveform 1115, along with its components, 1111 (4 cycles of the $f_1\angle 0°$ term) and 1112 (five cycles of the $f_2\angle 90°$ term), plus the resulting third order harmonic terms 1113 (3 cycles of the $2f_1+f_2$ term) and 1114 (six cycles of the $2f_2+f_1$ term).

Thus, waveform "A" 1125 is two tones at frequencies of $f_1\angle 0°$ and $f_2\angle 0°$, i.e., both at zero degrees. Waveform "B" 1135 is two tones at frequencies of $f_1\angle 0°$ and $f_2\angle -90°$, i.e., where F1 is at zero degrees and F2 is at -90 degrees. Waveform "C" 1115 is two tones at frequencies of $f_1\angle 0°$ and $f_2\angle 90°$, i.e., where $f_1$ is at zero degrees and $f_2$ is at 90 degrees.

The coupling mechanism into nonlinear elements is typically band-limited—i.e. filtered—either simply by the shape of the metal structure leaking the electromagnetic waves, or by an intentional filter in the path between an antenna and a nonlinear circuit. As a result, it is not always necessary to transmit, at the same time, the multiple frequencies making up each waveform. If the two frequencies are transmitted closely enough in time, the band-limiting filter will spread each frequency in time such that they overlap when they impinge on a nonlinear device, such that the same nonlinear terms still get generated.

FIG. 12 illustrates alternative A, B, and C waveforms, say A', B', and C', with the same phase/frequency construction as in FIG. 11 but where the first part of the waveform is at frequency $f_1$ and the later part of the waveform is at frequency $f_2$. In other words, instead of sending a pair of frequencies at the same time, a short close-spaced burst of each frequency is generated sequentially. While the phase jump between the first part and second part can happen instantly, it can be advantageous for the phase jump to happen phase-continuously over a short period of time, as is illustrated in FIG. 12.

Figure 12A:
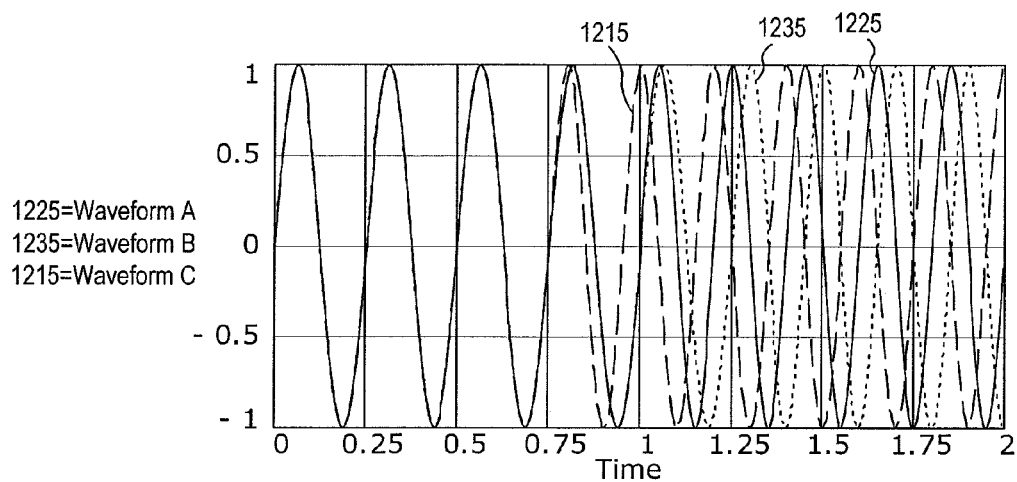
FIG. 12A is a voltage versus time plot showing three waveforms that are modulated such that linear and nonlinear terms can be isolated and measured.
Figure 12B:
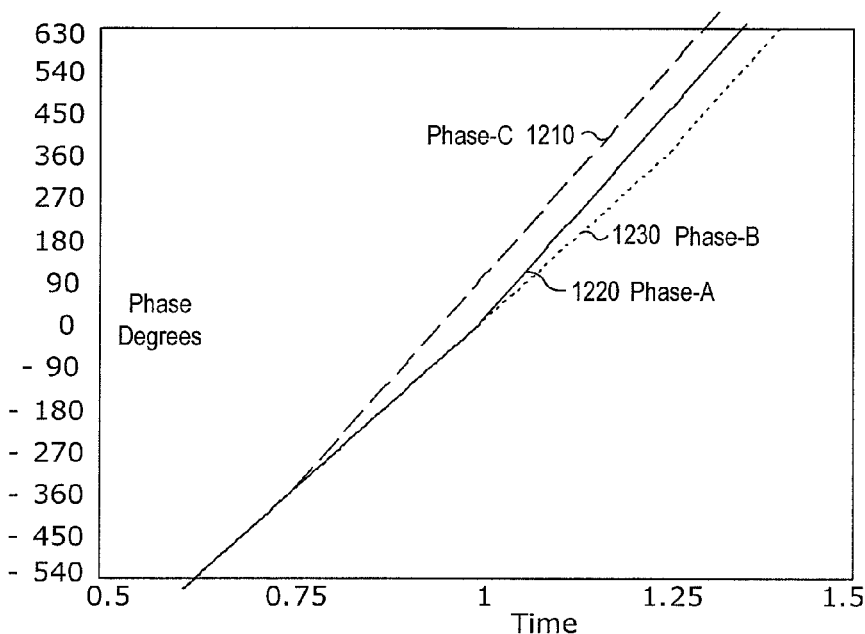
FIG. 12B is a phase versus time plot for the waveforms shown in FIG. 12A.

FIG. 12A shows waveform A' 1225, waveform B' 1235 and waveform C' 1215, which mimic waveforms 1125, 1135, and 1125 in FIG. 11. FIG. 12B shows in 1220, 1230, and 1210, the phase versus time of the waveforms of 1225, 1235, and 1215 respectively. In this case, the 90 degree phase changes occur over a period of about one cycle. Here, slope is proportional to frequency. Waveform A' shifts from $f_1$ to $f_2$ at time=1. Waveform B' is at frequency $f_1$ until time=1.25, at which point it is −90 degrees out of phase with waveform A'. It then shifts to frequency $f_2$ and remains −90 degrees out of phase with waveform A'. Waveform C' shifts to frequency $f_2$ at time=0.75 such that at time=1 it is exactly 90 degrees out of phase with waveform A'. From time=1 on it stays at 90 degrees out of phase with waveform A'.

The short sequential bursts, after passing through a narrowband filter, become overlaid in time. Any non-linear interaction with the overlaid tones generates the standard intermodulation terms. Each of the three different waveforms causes terms with different phase and magnitude to be generated, allowing isolation and identification of each term.

In the exemplary case shown in FIGS. 12A and 12B, with $f_1$=4 Hz and $f_2$=5 Hz, the required phase shifts for waveforms B' and C' are accomplished over a duration of a single cycle with smooth, continuous, phase-modulation, allowing the energy to be highly concentrated and not spread out due to abrupt or fast phase changes. Faster or slower transitions to the plus and minus 90 degree phase shifts can be used if desired for a particular application. Also, the different transition points can be used if desired. The best choice depends on the coupling mechanism, the bandwidth and group-delay characteristics of the effective filtering function, and the transmitter design.

In general, the following method of choosing the phase ramp tends to work out best when using two-tone waveforms. Let waveform A' be the one with both tones phased at 0 degrees—i.e. phases of $f_1$ and $f_2$ are (0,0). Define time t such that t=0 at the transition point from $f_1$ to $f_2$ on waveform A'. Let the time interval to modify the phase be allowed to go from −$t_a$ to +$t_a$. Let the phase-ramp, over the time of −$t_a$ to +$t_a$ cause a frequency of $f_t$ to be generated. In other words, the phase ramp slope will cause a frequency of $f_t$ to time −$t_a$, at which point the phase ramp slope will change to cause frequency $f_1$ to be generated until time +$t_a$, at which point the phase ramp slope will change to cause frequency $f_2$ to be generated. In this case, $t_a$ and $f_t$ can be made to so that they are a solution to the following equations to produce a positive or negative 90 degree phase shift:

$$f_t = f_1/2 + f_2/2 + 1/8t_a$$

$$f_t = f_1/2 + f_2/2 - 1/8t_a \quad (9)$$

With $f_1$=4 Hz and $f_2$=5 Hz, we can set $t_a$ to 0.25 seconds so that the 90 degree lead or lag can be accomplished with $f_t$ being equal to either $f_1$ or $f_2$, which is what is shown in FIG. 12. Whether switching to a plus or minus 90 degree waveform faster or slower, this formulation works well as it is phase-continuous and minimizes the bandwidth required of the transmitter for a given switching speed. Because it is phase-continuous, amplifiers generally respond to it well (without transient issues). By sequentially toggling between $f_1$ and $f_2$, and having waveform sets where each waveform has phase continuous, an amplifier can be made with enough bandwidth to largely eliminate the generation of intermodulation products from $f_1$ and $f_2$ since they do not exist at the same time within the transmitter. With this teaching, it is easy to see how these principles can be generalized to make other formulations for other "A, B, C" waveform sets.

With the above teaching it is clear that other waveform sets, some with more than three waveforms to allow measurement of higher order terms, will result in an invertible matrix that allows measurement of each individual term. The examples provided are buildable and provide a robust method to measure as many terms as desired.

(3) System and Method to Design and Use Single Pulse Pulse-Compression Waveforms Optimized for Wideband Nonlinear-Radar Sensitivity A third system and method may also be combined with the other methods disclosed here to build a nonlinear radar (NLR) better optimized for a particular application. This third system and method involves wideband single-pulse pulse-compression waveform design and use. Range resolution is a key factor in a radar's ability to isolate and detect a target. Range resolution, in meters, is proportional to c/B where B=Bandwidth in Hz, and c is the speed of light (299,792,458 m/sec). Instead of using tones for the fundamental (i.e. fundamental-1 and fundamental-2) $f_1$ and $f_2$ waveforms, a preferred embodiment by uses different wideband waveforms for $f_1$ and $f_2$. Wideband waveforms can be jointly designed to allow signal processing filtering processes to isolate linear and nonlinear responses on high range resolution time-resolved backscatter on very fast time scales. This resolution and speed is in stark contrast to isolating the nonlinear terms with narrowband filters since these filters don't allow good range resolution and are necessarily slow. The high speed opens the door to high speed analysis of the modulation on nonlinear terms. It is important that the fundamental waveforms be orthogonal or nearly orthogonal on both their linear and their nonlinear terms, regardless of time-lag between waveforms, so that sidelobes between waveforms are low.

For example, the interrogation signal can be composed of two linear-FM (chirp) signals that are not sweeping at the same rate. As a result, there are two tones, $f_1$ and $f_2$ at any instant in time, but instead of being fixed, their frequency is changing. The fundamental waveforms $f_{1C}$ and $f_{2C}$ can be defined to be chirps that ramp their frequency with time, but at different ramp-rates. The ramp rates need to be different for not only their fundamentals, but for all order harmonic terms of interest as well. For example, suppose a WiFi radio had a front-end bandwidth spanning nominally 2.4 to 2.5 GHz—a 100 MHz bandwidth. In this case, $f_{1C}$ could be a chirp that ramped at a rate of $f_{1r}$=100 MHz in 1 ms covering a frequency span of $f_{1a}$ to $f_{1b}$=2400-2500 MHz. At the same time, $f_{2C}$ could be a chirp ramping at a slower rate of $f_{2r}$=90 MHz in 1 ms, covering $f_{2a}$ to $f_{2b}$=2405-2495 MHz. With these waveforms, the nonlinear $f_{h1}$=2$f_1$−$f_2$ term would have a ramp rate of $f_{h1r}$=110 MHz and cover a frequency span of $f_{h1a}$ to $f_{h1b}$=2395-2505 GHz. The nonlinear $f_{h2}$=2$f_2$−$f_1$ term would have a ramp rate of $f_{h2r}$=80 MHz in 1 ms and cover a frequency span of $f_{h2a}$ to $f_{h2b}$=2410-2490 MHz. While the two linear terms and the two 3rd order harmonic terms overlap in frequency, allowing good coupling into and out-of the WiFi radio, their ramp rates are sufficiently different that a matched filter can separate each response. The ramp-rates and durations can be designed to optimize the pulse compression processing so as to maximize the isolation and range resolution while also minimizing the sidelobes between the four waveforms, $f_{1C}$, $f_{2C}$, $f_{h1}$, and $f_{h2}$. By making these four chirps orthogonal, or nearly orthogonal, at any time lag relative to each other, the radar's performance can be optimized for both sensitivity and range resolution.

The "matched filter" for such a system of waveforms can be a simple white-noise based classic matched filter. But the preferred embodiment uses a matched-filter for each term that has been optimized in a joint sense to isolate the desired term. For example, a least-squares minimizing approach like Gram-Schmidt can be used. For another example, a maximum likelihood method can be used to optimize the filter's capability of isolating and measuring each term.

In addition to gaining isolation via nominally orthogonal chirped waveforms as shown above, orthogonal phase coded sequences, such as using a set of Gold codes or Golay codes, etc. can be used. Furthermore, opportunistic signals such as HDTV signals broadcast from sever different locations could be captured (i.e. both a clean direct path signal from an antenna aimed at the TV transmitter, and a reflected signal from an antenna aimed to the area under observation) and used as the transmit energy.

(4) Non-Model Based Dynamic Range and Spectral Resolution Enhancement

A fourth system and method includes using enhanced spectral analysis (ESA) that enhances dynamic range by suppressing sidelobes and by enhancing the spectral resolution relative to classic spectral analysis methods such as a Fourier transform coupled with a particular window or taper function. U.S. patent application Ser. No. 13/708,832, entitled "METHOD AND SYSTEM FOR PROCESSING RECEIVED DATA," and filed on 7 Dec. 2012, by McCorkle, the contents of which are hereby incorporated by reference in their entirety, discloses details on ESA that operates well at low SNR and allows high time resolution simultaneously with high frequency resolution. The use of ESA on nonlinear radar (NLR) backscatter brings multiple benefits.

First, because the nonlinear radar relies on a coupling means of unknown and typically small bandwidth, it is vital to maximize the NLR's resolution under a highly constrained bandwidth situation. ESA can be applied on the pulse compression processing to enhance the range resolution and improve the dynamic range by suppressing range and or Doppler sidelobes. Second, in addition to the enhance spatial resolution, its enhanced spectral resolution will allow better characterization of fine structure in harmonic returns. Third, small nonlinear returns that would, with conventional processing, be masked by sidelobes from neighboring spectral responses, could be isolated and clear. Fourth, ESA will aid inspection of how the harmonics change with time—i.e. how they are modulated. The modulation may provide instrumental signatures useful for discriminating between different target types. For example, the harmonic time signature may allow identification of a specific cell-phone model, or a specific software build on a specific cell phone, or it might indicate what mode a device is in.

Ultra Linear Core Circuit Design

Underlying any combination of methods disclosed here, the preferred embodiment would use core circuit topologies and components known to have high dynamic range and linearity. The goal is to provide a low "baseline" harmonic floor from the core components making up the radar system, such that the methods disclosed here can make further improvements. High speed, high linearity technologies include SiGe and SiGe-BiCMOS, GaAs, InGaP, GaN, and PHEMPT semiconductor technologies. These are applied to components like amplifiers, mixers, ADCs, DACs, etc. Circuit topologies include highly balanced circuits, such as combining multiple amplifiers using wideband 90 degree and 180 degree hybrid couplers.

(5) Digital Pre-Distortion and Feedback Loops to Linearize Functional Blocks Like the Transmitter The fifth methodology uses one or more of the first (nulling self generated nonlinearities), second (using multiple waveforms), and/or third (using jointly designed wideband waveforms) systems and methods to measure, with extremely high sensitivity, nonlinear terms of devices like a DAC or transmitter power amplifier, and then use those measurements to generate a signal $\hat{f}_h$ that is added in such a way as to drive the nonlinear terms to zero. In other words, this method involves wrapping a harmonic nulling feedback loop around components like the signal generator and transmitter amplifier to enhance their baseline linearity. Besides NLR, this method is advantageous wherever other linearization methods are used, such as low-power handheld applications and OFDM communications. The signal calculated to null the non linear terms, $\hat{f}_h$, can be inserted in a variety of places along the signal path. For example, it can be inserted early in the path as a pre-distortion compensation term prior to the transmit amplifier, or it can be summed late in the path, such as at the system output. It can be made via its own DAC to allow it extremely high resolution and insertion anywhere. Alternatively, it can be added to the fundamental signal so that it is made in the same DAC that makes the fundamental signal.

Figure 13A:
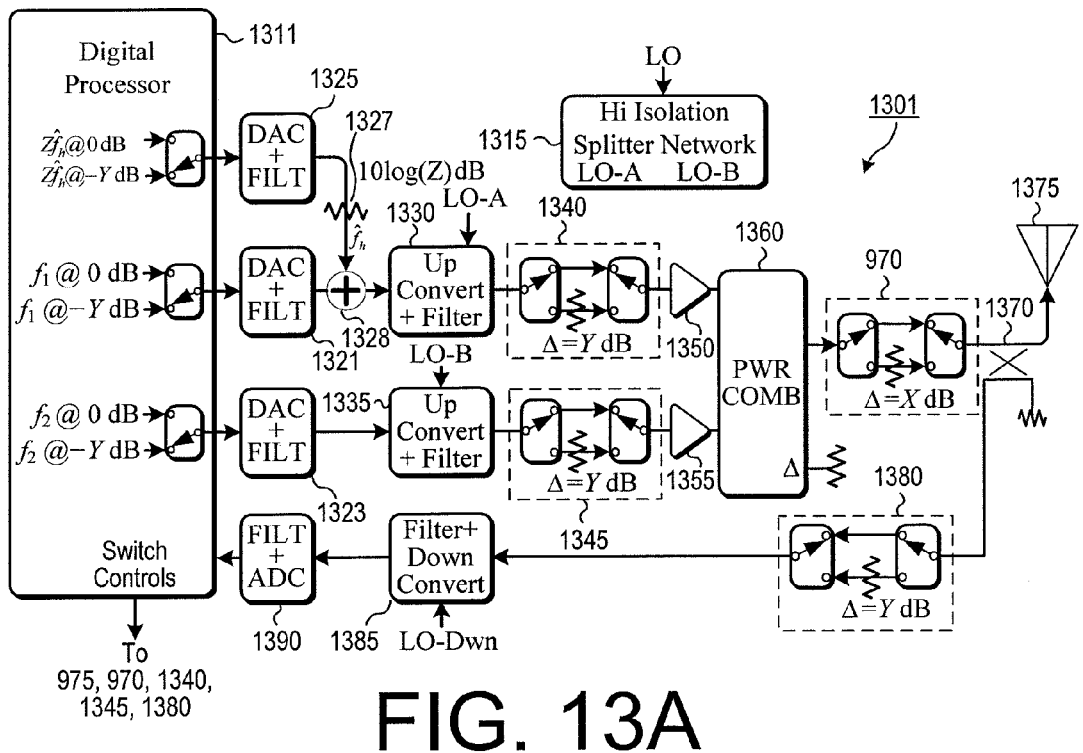
FIGS. 13A, 13B, and 13C are circuit diagrams of transmitters with gain switches and a feedback path configured to allow isolation, measurement, and mitigation of self generated non-linear terms, according to disclosed embodiments.
Figure 13B:
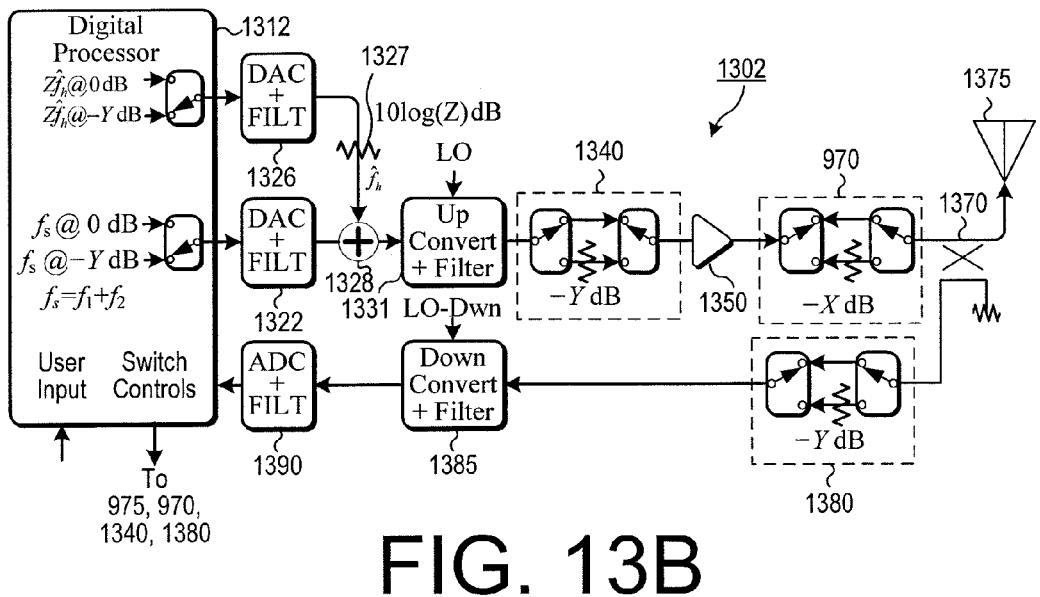
Figure 13C:
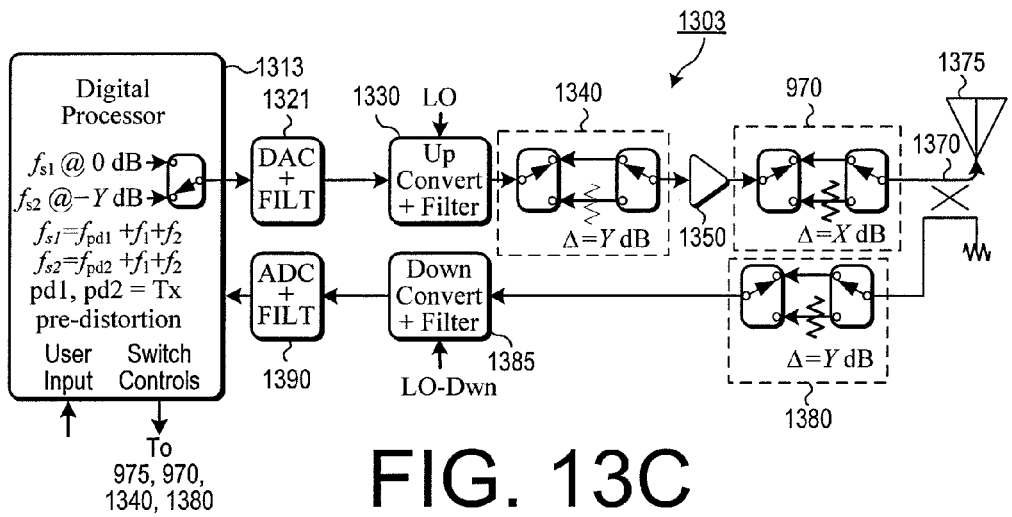

FIGS. 13A-13C illustrate some embodiment options for a transmit architecture, some that optimize cost, others that optimize performance, and some with a tradeoff in between.

FIG. 13A is a transmit architecture 1301 according to one disclosed embodiment. As shown in FIG. 13A, the transmit architecture 1301 includes a digital processor 1311, first digital-to-analog converter (DAC) and filter 1321, second DAC and filter 1325, attenuator 1327, summer 1328, third DAC and filter 1323, first up-converter and filter 1330, second up-converter and filter 1335, first and second amplifier-input switched attenuators 1340, 1345, first and second amplifiers 1350, 1355, a power combiner 1360, an output switched attenuator 970, a coupler 1370, an antenna 1375, a receiver switched attenuator 1380, a filter and down-converter 1385, a filter and analog-to-digital converter (ADC) 1390, and a source of local oscillator signals 1315.

The digital processor 1311 generates fundamental waveforms $f_1$ and $f_2$, the control signals driving attenuators 970, 975, 1340, 1345, 1365, and 1380, and a distortion cancelation signal $\hat{f}_h$. It calculates $\hat{f}_h$ so as to minimize nonlinear terms in the output based on one of more of the previously described methods. For example, digital processor 1311 can calculate $\hat{f}_h$ based on measurements of the harmonic terms using information gained by using attenuator switches 1380/1340/1345 (the transmit amplifier alone), and 1380 plus its internal gain setting switches (the DACs, up-converters, and transmit amplifier chain) according to the first system and method with its detailed description described above. It can also calculate $\hat{f}_h$ based on measurements of the harmonic terms using information gained by using a set of three or more waveforms according to the second system and method with its detailed description described above. It can also calculate $\hat{f}_h$ based on measurements of the harmonic terms using information gained by using a set of wideband waveforms according to the third system and method with its detailed description described above. It can combine these methods to improve the performance. It can also augment them with enhanced spectral analysis (ESA) techniques. The net result is that the baseline linearity of the core transmit path would be enhanced, so that applying the first, second, and third system and methods around the entire radar would produce an even better working NLR.

The first digital-to-analog converter (DAC) and filter 1321 generates the $f_1$ fundamental waveform. The second DAC and filter 1325 generates the correction waveform $Z\hat{f}_h$. Attenuator 1327, a 20 log(Z) dB attenuator, allows DAC 1325 to generate the correction signal $\hat{f}_h$ with extremely high resolution. For example, if the attenuator reduces the voltage by a factor of 1000 (60 dB), then the correction waveform can have 1000 times the resolution of the fundamental waveform. Combiner 1328 sums the fundamental waveform $f_1$ and the attenuated correction waveform $\hat{f}_h$. The third DAC and filter 1328 generates the $f_2$ fundamental waveform. Each DAC and filter 1321, 1328 only needs to make a single fundamental waveform and therefore will not generate cross terms like a $2f_1-f_2$ term since it only has a single tone at any instant in time. If these DACs are not capable of directly generating the required RF frequency, then the up-converter/filters, 1330 and 1335 are used to shift the DAC frequencies up. Otherwise, these up-converter/filters are not needed and the signal from the DAC/filters would just pass through.

The first and second amplifier input switched attenuators 1340, 1345 operate at 0 or Y dB of attenuation, are controlled by processor 1311, and pass the signal from up-converter/filters, 1330 and 1335 to the transmit amplifier, which is formed by the first and second amplifiers 1350, 1355 and power combiner 1360.

The amplifier switched attenuator 970 works together with switched attenuator 975 in FIG. 9 according to the first system and method to null all self-generate nonlinear terms.

The coupler 1370 passes the transmit signal to antenna 1375, and sends a sample of the transmit signal to the receiver switched attenuator 1380 to create an attenuated transmit signal. Receiver switched attenuator 1380 sends the attenuated transmit signal to the filter/down-converter 1385. Filter/down-converter 1385 shifts the frequency of the attenuated sampled transmit signal down to a band where the filter/ADC 1390 can sample the signal and generate a digitized attenuated transmit signal. Filter/ADC 1390 sends the digitized attenuated transmit signal to the processor 1311 where it is used according to one or more of the first, second, and third systems and methods, potentially augmented with ESA techniques.

Key for application of the first system and method is the operation of the Y dB switch attenuators, which are configured to allow measurement of nonlinearity in the DAC and upconverter, and the amplifier. By alternately switching the Y dB attenuator in the feedback path at the bottom of the figure, with the other Y dB attenuators, the level of signals in the feedback chain remain fixed, such that they can be canceled, while the nonlinear properties the transmit chain are isolated and measured.

FIG. 13B is a transmit architecture 1302 according to one disclosed embodiment. It is nearly identical with transmit architecture 1301, but uses a single-path DAC 1322, up-converter 1331, switched attenuator 1340, and amplifier 1350, instead of dual-path shown in 1301 of FIG. 13A. As a result, the uncorrected performance will be lower since each of these components will now make intermodulation distortion products that were eliminated in the dual-path architecture. But this structure is advantageous in terms of size, weight, power and cost, especially since it may perform just as well after applying one or more of the first, second, and third systems and methods.

FIG. 13C is a transmit architecture 1303 according to one disclosed embodiment. It is nearly identical with transmit architecture 1302, but uses a single DAC 1321 to make the corrected signal instead of a pair of DACs, an attenuator, and a summer. As a result, the performance may be lower since the correction signal cannot be created with as much resolution. But this structure is advantageous in terms of size, weight, power and cost.

(6) Dynamic Range Extension

The sixth method and system combines "stretch" processing with the third method and system to reduce the energy the ADC is exposed to and thereby extend the dynamic range and improve the effective linearity of the system.

Figure 14:
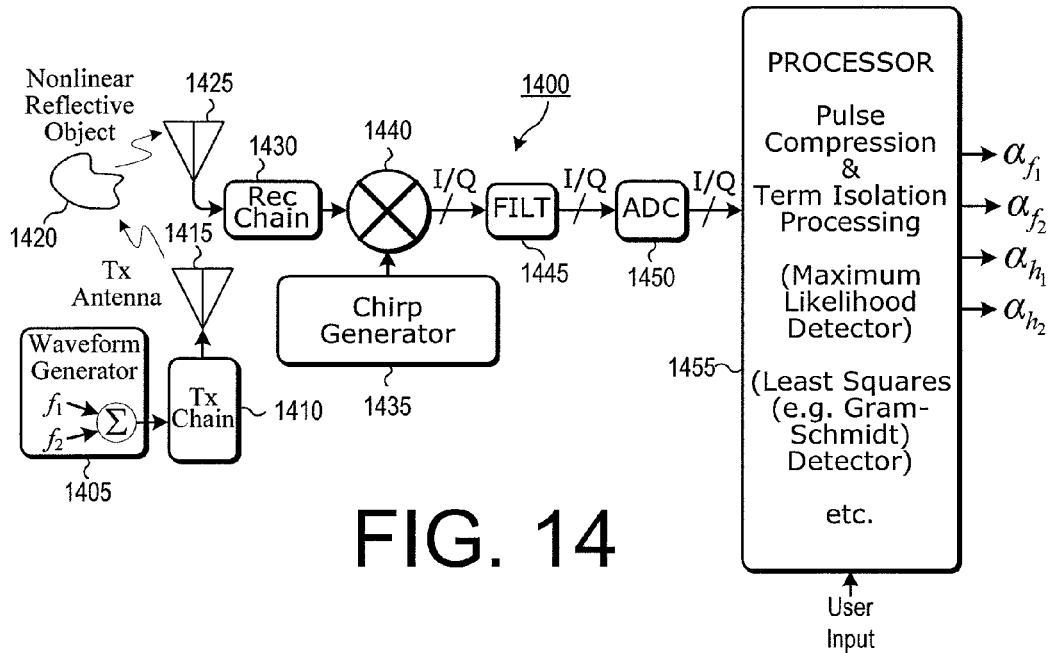
FIG. 14 is a circuit diagram of a single-channel receiver according to disclosed embodiments.

FIG. 14 is a block diagram showing a single channel system 1400. As shown in FIG. 14, the single channel system 1400 includes a waveform generator 1405 that produces the fundamental wideband waveforms according to the third method and system, a transmitter chain 1410, an antenna 1415 that transmits the waveforms, a receiver antenna 1425, receiver chain 1430 that typically has a low noise amplifier and depending on how high the frequencies are, may have a down-converter stage that shifts the frequency to an intermediate frequency (IF), a mixer 1440, that may be an image-reject type of mixer, a local oscillator (LO) waveform generator 1435 that produces a chirp waveform that is nominally aligned to, and has the same ramp-rate as, one of the received waveforms $f_1$ or $f_2$, or $h_1$ the $2f_1-f_2$ term, or $h_2$, the $2f_2-f_1$ term, but can also have a ramp-rate of zero such that it produces a sinusoidal (tone) such that "stretch" is not used and all of the matched filter processing is done in the processor 1455, a receiver filter 1445, an ADC 1450, and a processor 1455.

In this design, the ADC 1450 must receive all linear and nonlinear terms simultaneously. "Stretch" processing is well known in the radar art to be a method that works well when there is a relatively small range swath—i.e. the time covered between the nearest to the farthest point is small relative to the duration of the chirp waveform. "Stretch" operates by mixing the transmitted chip signal, sometimes delayed by some period of time, with the incoming received signal. As is well known in the art, for a target at a particular range, this mixing action results in an output tone, where the frequency of the tone is proportional to the range to the target. A key benefit of the "stretch" architecture is that the filter 1445 can have significantly less bandwidth than the bandwidth covered by the chirp waveform. As a result, less energy hits the ADC, and the ADC sample rate and bandwidth can be much lower, allowing the ADC to have significantly more bits of precision and lower nonlinear terms.

The third method and system, however, does not use the standard chirp signal. Instead, it creates a waveform that contains multiple chirp waveforms. At the receiver, each linear and nonlinear term reflected by a nonlinear target is a chirp that has its own unique ramp-rate. It will be appreciated that a standard single-channel stretch architecture 1400 can be adapted to process the multiple chirp ramp rates if the filter 1445 and ADC 1450 cover the bandwidth of all the signals, and if the processor 1455 is augmented to look not only for tones, but also for chirps. It will be appreciated that the LO waveform generator 1435 can have its ramp-rate set to align to any of the linear or non-linear terms. The term that it is aligned will operate in the standard "stretch" way and be converted to a tone. It will be appreciated that all the other terms will become chirps with their ramp-rates affected by the ramp-rate of the LO waveform generator 1435. That being the case, the processor 1455 can apply a set of filters where each filter passes only signals with a particular ramp-rate that matches one of the terms of interest, and rejects the other ramp rate signals as well as noise. The processor can then generate a separate standard range profile for each linear and nonlinear term that it has a filter for. Processor 1455 is shown with an output for each linear term $f_1$ and $f_2$, and two third-order nonlinear terms, $h_1$, the $2f_1-f_2$ term, and $h_2$, the $2f_2-f_1$ term. Of course, any number of other order terms, with other chirp ramp-rates, could also be output. Each one of the outputs could be further processed across multiple pulses in processor 1455 to create a range-Doppler map or micro-Doppler signatures to look for target motion or modulation or vibration associated with each term. Each one of these outputs can also be processed across multiple pulses in processor 1455 with synthetic aperture radar (SAR) or inverse synthetic aperture radar (ISAR) focusing methods to create high resolution images in both range and cross-range for each of the harmonic responses.

Figure 15:
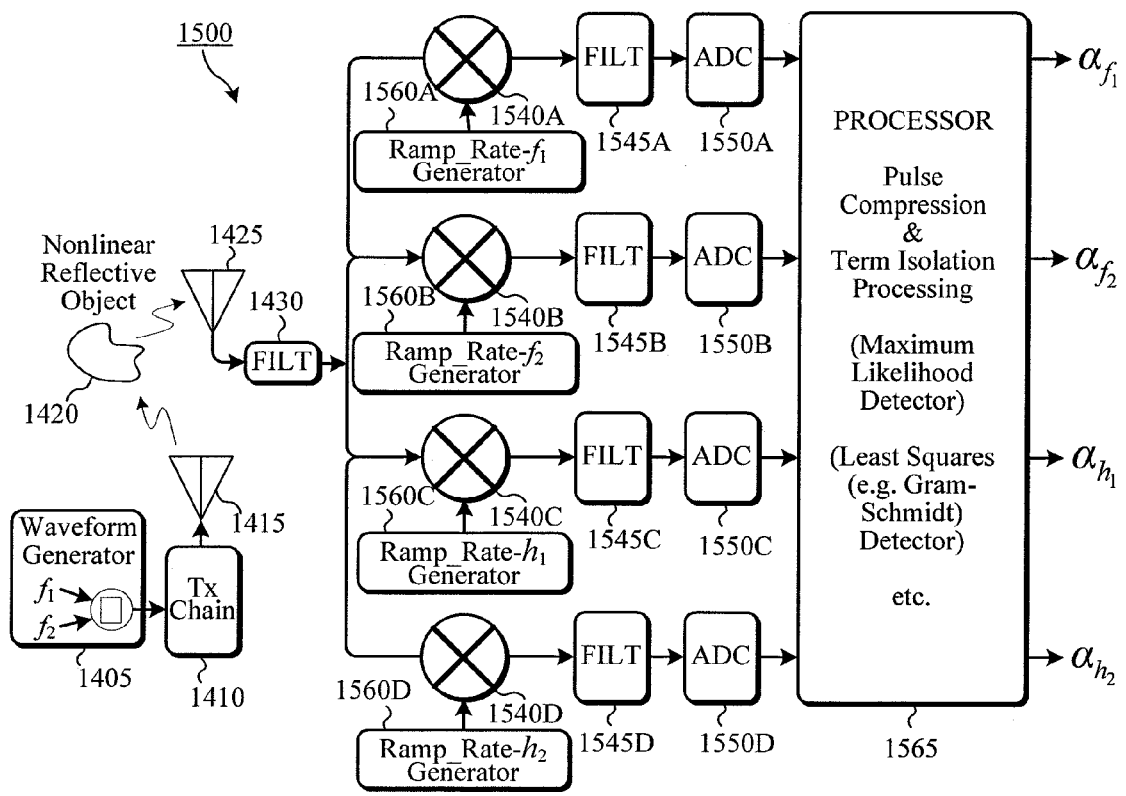
FIG. 15 is a circuit diagram of a multiple-channel receiver according to disclosed embodiments.

FIG. 15 shows a multiple channel receiver 1500, that is similar to FIG. 14, but provides a separate "stretch" chain (de-ramp mixer 1540 A, B, C and D, LO chirp generator 1560 A, B, C and D, filter 1545 A, B, C and D, and ADC 1550 A, B, C and D) that is ramp-rate matched to each linear and nonlinear term of interest. As a result, the filters 1545 can be the narrowest possible and minimize the energy going into each ADC 1550. Each ADC 1550 accepts the desired term, while other terms are suppressed to some degree. By virtue of (1) separately pre-processing to prefer one term at the output of the mixer and filter, and (2) having other terms generate lower and different inter-modulation products in the remaining circuits and ADC, the digital signal processor can operate on the multiple signals and isolate the different order terms. In FIGS. 14 and 15, like numbers are used to represent similar elements, so they will not be individually described. Processor 1565 takes the outputs from ADCs 1550 A, B, C, and D, and performs filtering to isolate each term of interest. The filtering function can be a simple classic white-noise based matched filter, or a better performing multi-user based filter that applies modern DSP techniques such as maximum likelihood, Gram-Schmidt orthogonalization, and least squares.

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A nonlinear radar (NLR) comprising:
transmitter circuitry configured to generate a plurality of base transmission pulses at a base transmission power;
a switchable transmitter power-modifying circuit configured to receive the plurality of base transmission pulses, and for each of the base transmission pulses, to select a transmitter power-modification path from a first transmitter power-modification path that modifies the base transmission power to a first transmission power, and a second transmitter power-modification path that modifies the base transmission power to a second transmission power, the second transmission power being greater than the first transmission power;
a transmitter antenna configured to transmit the power-modified transmission pulses toward a reflective object;
a receiver antenna configured to receive a plurality of base reflected pulses at differing base reflected powers;
a switchable receiver power-modifying circuit configured to receive the plurality of base reflected pulses, and for each of the base reflected pulses, to select a receiver power-modification path from a first receiver power-modification path that modifies the base reflected power to a first receiver power, and a second receiver power-modification path that modifies the base reflected power to a second receiver power, the first receiver power being greater than the second receiver power;
receiver circuitry configured to process the power-modified reflected pulses,
wherein
each base reflected pulse corresponds to a corresponding power-modified transmission pulse that has been reflected off the reflective object,
a transmission ratio of the first transmission power to the second transmission power is the same as a receiver ratio of the second receiver power to the first receiver power,
the receiver circuitry is configured to subtract one of a first power-modified reflected pulse and a second power-modified reflected pulse from the other of the first power-modified reflected pulse and the second power-modified reflected pulse,
the first and second power-modified reflected pulses are based on identical base transmission pulses,
the first power-modified reflected pulse is at the first receiver power, and is based on a first power-modified transmission pulse that was transmitted at the first transmission power, and
the second power-modified reflected pulse is at the second receiver power, and is based on a second power-modified transmission pulse that was transmitted at the second transmission power.

2. The nonlinear radar of claim 1, wherein
the two transmitter power-modifying paths include first and second transmitter power-modification paths,
the first transmitter power-modification path passes the base transmission signal unmodified as the power-modified transmission signal, and
the second transmitter power-modification path reduces the transmission power of the base transmission signal by a first power reduction to generate the power-modified transmission signal.

3. The nonlinear radar of claim 1, wherein
the transmitter antenna and the receiver antenna are the same antenna.

4. The nonlinear radar of claim 1, wherein
the transmission ratio and the receiver ratio are both 0.5.

5. The nonlinear radar of claim 1, further comprising
a timing control circuit configured to control operation of the switchable transmitter power-modifying circuit and the switchable receiver power-modifying circuit.

6. The nonlinear radar of claim 1, wherein the switchable transmitter power-modifying circuit further comprises:
a first transmitter switch configured to select the selected transmitter power-modification path, receive the base transmission pulse from the transmitter circuitry, and pass the base transmission pulse from the transmitter circuitry to the selected transmitter power-modification path;

the two transmitter power-modification paths, each configured to modify the transmission power of the base transmission pulse by one of two different power-modification values, respectively, to generate the power-modified transmission pulse; and a second transmitter switch configured to select the selected transmitter power-modification path, to receive the power-modified transmission pulse from the selected transmitter power-modification path, and to pass the power-modified transmission pulse from the selected transmitter power-modification path to the transmitter antenna.

7. The nonlinear radar of claim 6, wherein the switchable receiver power-modifying circuit further comprises:

a first receiver switch configured to select the selected receiver power-modification path, receive the base reflected pulse from the receiver antenna, and pass the base reflected pulse from the receiver antenna to the selected receiver power-modification path;

the two receiver power-modification paths, each configured to modify the received power of the base reflected pulse by one of the two different power-modification values, respectively, to generate the power-modified reflected pulse; and a second receiver switch configured to select the selected receiver power-modification path, to receive the power-modified reflected pulse from the selected receiver power-modification path, and to pass the power-modified reflected pulse from the selected receiver power-modification path to the receiver circuitry.

8. The nonlinear radar of claim 1, wherein the switchable receiver power-modifying circuit further comprises:

a first receiver switch configured to select the selected receiver power-modification path, receive the base reflected pulse from the receiver antenna, and pass the base reflected pulse from the receiver antenna to the selected receiver power-modification path;

the two receiver power-modification paths, each configured to modify the received power of the base reflected pulse by one of two different power-modification values, respectively, to generate the power-modified reflected pulse; and a second receiver switch configured to select the selected receiver power-modification path, to receive the power-modified reflected pulse from the selected receiver power-modification path, and to pass the power-modified reflected pulse from the selected receiver power-modification path to the receiver circuitry.

9. The nonlinear radar of claim 1, wherein the switchable transmitter power-modifying circuit is configured to regularly alternate between selecting each of the two available transmitter power-modification paths.

10. A method of detecting a remote object comprising:

generating a plurality of base transmission pulses at a same base transmission power;

selectively modifying the base transmission power of each of the plurality of base transmission pulses to each become one of a first transmission power and a second transmission power, the second transmission power being greater than the first transmission power, in order to generate a plurality of power-modified transmission pulses;

transmitting the plurality of power-modified transmission pulses toward a reflective object;

receiving a plurality of base reflected pulses at differing base reflected powers;

selectively modifying the base reflected power of each of the plurality of base reflected pulses to each become one of a first receiver power and a second receiver power, the first receiver power being greater than the second receiver power, in order to generate a plurality of power-modified reflected pulses; and subtracting one of a first power-modified reflected pulse and a second power-modified reflected pulse from the other of the first power-modified reflected pulse and the second power-modified reflected pulse wherein each base reflected pulse corresponds to a corresponding power-modified transmission pulse that has been reflected off the reflective object, a transmission ratio of the first transmission power to the second transmission power is the same as a receiver ratio of the second receiver power to the first receiver power, the first and second power-modified reflected pulses are based on identical base transmission pulses, the first power-modified reflected pulse is at the first receiver power, and is based on a first power-modified transmission pulse that was transmitted at the first transmission power, and the second power-modified reflected pulse is at the second receiver power, and is based on a second power-modified transmission pulse that was transmitted at the second transmission power.

11. The method of claim 10, wherein two transmitter power-modifying factors includes first and second transmitter power-modification factors, the first transmitter power-modification factor makes a second power of the power-modified transmission signal equal to a first power of the base transmission signal, and the second transmitter power-modification factor makes the second power of the power-modified transmission signal equal to the first power of the base transmission signal reduced by a power-reduction factor.

12. The method of claim 10, wherein in the operation of selectively modifying a transmission power of each of the plurality of base transmission pulses, the operation regularly alternates between selecting each of two available transmitter power-modification factors.

13. The method of claim 1, wherein the transmission ratio and the receiver ratio are both 0.5.

* * * * *